(12) United States Patent
Saha et al.

(10) Patent No.: US 7,380,276 B2
(45) Date of Patent: May 27, 2008

(54) PROCESSOR EXTENSIONS AND SOFTWARE VERIFICATION TO SUPPORT TYPE-SAFE LANGUAGE ENVIRONMENTS RUNNING WITH UNTRUSTED CODE

(75) Inventors: Bratin Saha, San Jose, CA (US); Weldon Washburn, San Jose, CA (US); James Paul Held, Portland, OR (US)

(73) Assignee: Intel Corporation, Santa Clara, CA (US)

(*) Notice: Subject to any disclaimer, the term of this patent is extended or adjusted under 35 U.S.C. 154(b) by 791 days.

(21) Appl. No.: 10/851,860

(22) Filed: May 20, 2004

(65) Prior Publication Data
US 2005/0273605 A1 Dec. 8, 2005

(51) Int. Cl.
G06F 17/30 (2006.01)
G06F 11/00 (2006.01)
(52) U.S. Cl. ............................. 726/22; 726/25; 726/26
(58) Field of Classification Search .................. 726/30, 726/16, 22, 25, 26; 171/162
See application file for complete search history.

(56) References Cited

OTHER PUBLICATIONS

Security Briefs: Beware of Fully Trusted Code—MSDN Magazine, Apr. 2004; http://msdn.microsoft.com/msdnmag/issues/04/04/SecurityBriefs/, year 2004.*
Trusted search software labels fraud site as 'safe', http://www.theregister.co.uk/2005/09/27/untrusted_search/, year 2005.*
News, SIP: News; Secure Internet Programming; http://www.cs.princeton.edu/sip/history/, year 2000.*
Auto-coding/auto-proving flight control software Tudor, N.; Adams, M.; Clayton, P.; O'Halloran, C.; Digital Avionics Systems Conference, 2004. DASC 04, The 23rd vol. 2, Oct. 24-28, 2004 pp. 6.E.4-61-11 vol. 2.*
Best practices in code inspection for safety-critical software de Almeida, J.R., Jr.; Camargo, J.B., Jr.; Basseto, B.A.; Paz, S.M.; Software, IEEE vol. 20, Issue 3, May-Jun. 2003 pp. 56-63.*
The power of 10: rules for developing safety-critical code Holzmann, G.J.; Computer vol. 39, Issue 6, Jun. 2006 pp. 95-99.*

* cited by examiner

Primary Examiner—David Y Jung
(74) Attorney, Agent, or Firm—Blakely, Sokoloff, Taylor & Zafman LLP

(57) ABSTRACT

Processor extensions and software verification to support type-safe language environments running with untrusted code. Code and data spaces are partitioned into trusted and untrusted regions. Type-safe code is loaded into the trusted region of the code space, while non-type-safe code is loaded into the untrusted region of the code space. The trusted region of the data space is allocated to the type-safe code. The untrusted region of the data space is allocated to the non-type-safe code. Hardware-based truth tables are employed for defining allowable and disallowable code sequences and memory access operations. For code sequences, allowable operations are based on the location (i.e., region) of a code sequence including a current instruction and a prior instruction. For memory access, the location of the requesting instruction and data requested are considered. Disallowed code sequence or memory access operations cause the processor to generate a safe access protection trap. In response to the safe access protection trap, a software-based dynamic verifier applies a security policy to determine whether to allow the operation to proceed.

45 Claims, 15 Drawing Sheets

MEMORY ACCESS TRUTH TABLE

CODE SEQUENCE TRUTH TABLE

US 7,380,276 B2

PROCESSOR EXTENSIONS AND SOFTWARE VERIFICATION TO SUPPORT TYPE-SAFE LANGUAGE ENVIRONMENTS RUNNING WITH UNTRUSTED CODE

FIELD OF THE INVENTION

The field of invention relates generally to computer systems and, more specifically but not exclusively relates to processor extensions and software verification to support trusted (for example, type-safe) language environments running with untrusted code.

BACKGROUND INFORMATION

Most of today's software is written in "unsafe" languages, such as C or C++, which is compiled into native machine code using compilers targeted to specific processor instruction set architectures. These languages are unsafe because they have provisions for direct un-checked memory manipulation or access, either via built-in functionality (i.e., pointer indirection and manipulation), extensions, or in-line assembly. For example, a memory operation for a particular unsafe application module may actually change the memory in a portion of the memory address space that is assigned to another application module. This may lead to corruption of documents produced by the other application or a system crash, among other undesired effects. Thus, the native code the languages generate is not trustworthy.

The code safety problem is exacerbated by today's modular code environments. Operating systems and software programs are getting more modular as they seek to provide richer features. They are increasingly built out of components developed independently, often by different teams. This leads to packages built out of components that have different levels of trustworthiness. For example, while the kernel of an operating system (OS) may contain trusted code, it interfaces with device drivers written by third-party vendors. In general, the OS vendor cannot verify the trustworthiness of the third party code. This causes a delineation of trust boundaries in the operating system. Furthermore, applications running on the operating system may also have such a delineation of trust boundary.

More specifically, many large applications use dynamically linked libraries (DLLs), often developed by independent software vendors. For example, a browser often uses a range of plug-ins developed by completely independent vendors. The large number of third-party modules used in many of today's program environments often make it impractical or even impossible to determine whether the environment is entirely safe.

One technique for addressing the code safety problem is to use a type-safe language. For example, Java and C# are type-safe languages, which do not allow direct memory manipulation. Rather, these languages run on a platform-dependent virtual machine (e.g., the Java Virtual Machine or JVM), which manages all memory interfaces with the processor and/or operating system. The virtual machine provides a level of abstraction between the platform-independent programming language and the platform specific processor instruction set architecture. In fact, platform-independent languages such as JAVA do not support direct memory manipulation or access.

Although Java and C# do not allow direct memory manipulation, they are often required to interface with code or modules that do. For example, it is often necessary to access low-level system functionality (for example, to output data to a monitor) that is not supported by a platform-independent language. Thus, both Java and C# provide extensions to support calls to modules or code written in unsafe languages. Accordingly, such "mixed" program code can no longer be considered inherently safe. This compromises the trustworthiness of the program code.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 6b is a schematic diagram illustrating further details of the trusted memory access process of FIG. 6a;

FIG. 11b is a schematic diagram illustrating further details of the untrusted code sequence process of FIG. 11a;

DETAILED DESCRIPTION OF PREFERRED EMBODIMENTS

Figures 1, 2A, 2B:
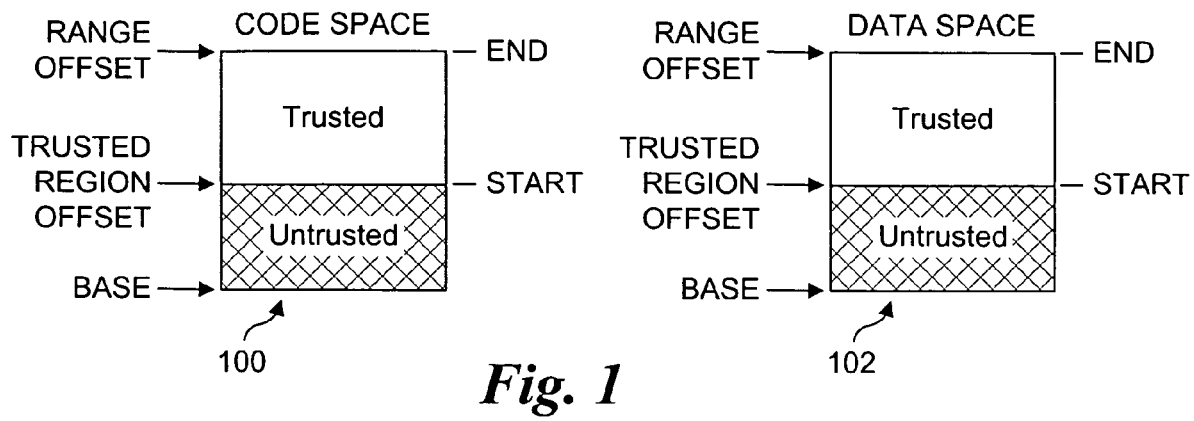
FIG. 1 is a schematic diagram of a memory-partitioning scheme that divides a code space and a data space into trusted and untrusted regions, according to one embodiment of the invention.
FIG. 2a is a diagram of a memory access truth table implemented in conjunction with the memory-partitioning scheme of FIG. 1, according to one embodiment of the invention.
FIG. 2b is a diagram of a code sequence truth table implemented in conjunction with the memory-partitioning scheme of FIG. 1, according to one embodiment of the invention.

Embodiments of methods, apparatus, and systems for supporting type-safe language environments running with untrusted code are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the embodiments described herein, techniques are disclosed for supporting type-safe language environments that implement non-safe code extensions. As used herein, the software implemented in these environments is termed NUT (Not-Uniformly Trusted) software, which refers to software packages created out of components having different levels of trustworthiness.

The potential of detrimental behavior of NUT software gets more pronounced in managed-runtime environments, such as Java and CLI (Common Language Infrastructure, used in Microsoft's .NET programming framework). These environments are primarily based on type-safe programming languages such as Java and C#. Type-safety requires that the runtime system provide at least the following guarantees:

Memory safety: This means that application code can only make "legal" memory accesses. This implies that it cannot access unallocated memory areas, and can not read variables that have not been initialized. This also means that it can not update variables with values of incompatible types, such as writing a floating point value into an integer variable; and.

Control-flow safety: This means that application code cannot jump to arbitrary memory locations, but only to well-defined entry points. This also means that return addresses cannot be forged.

To ensure these properties, a type-safe language must forbid certain operations that are possible in unsafe languages such as C and C++. Examples include pointer arithmetic, taking the address of a variable, bit fiddling, etc. On the other hand, these operations are often needed for low-level system functionality. Therefore, these languages provide a mechanism (in Java, this is called a native method interface) that lets a type-safe program call code written in unsafe (i.e., non-type-safe) languages. The code written in unsafe languages is often called native code, (although this is not to be confused with the native machine code to which the unsafe language is eventually compiled to).

Most, if not all, enterprise class applications written in type-safe languages use native code to access system functionality. In turn, this creates a software package with a mixture of trusted and untrusted components. While the type-safe portion is mechanically verified and guaranteed to be safe, the native code comes with no such guarantees.

Any application is only as secure as its weakest link. As a result, NUT software is often compromised through its untrusted components. For instance, a type-safe Java application can be easily subverted by corrupt native code; the built-in safety of the programming language is of no help here.

In accordance with one embodiment, code safety is addressed via implementation of a memory-partitioning scheme, wherein trusted type-safe code and data operated on by that code is isolated from untrusted non-type-safe code. In one embodiment, the memory-partitioning scheme partitions code and data into separate address spaces, and then sub-partitions those address spaces into trusted and untrusted regions. For example, FIG. 1 shows a memory-partitioning scheme in accordance with one embodiment, wherein each of a code space 100 and data space 102 are partitioned into untrusted and trusted regions. In general, each of code space 100 and data space 102 occupy separate address ranges in a memory address space accessible to a processing core, such as a microprocessor. In one embodiment, memory address space is a flat (i.e., linear) address space that may be addressed using a virtual address scheme, a physical address scheme, or a combination of the two. In another embodiment, the memory address space employs a segmented address scheme.

In each of code space 100 and data space 102, the untrusted region occupies the portion of the spaces address range spanning a base address (for the space) to a trusted region offset (address), while the trusted region occupies the portion of the address space from the trusted region offset to the space's limit address. Thus, the trusted region offset represents the boundary between the trusted and untrusted regions. Instructions occupying the untrusted region of code space 100 are deemed unsafe and thus untrusted, while instructions occupying the trusted region of the code space are deemed safe and thus trusted. Similarly, data occupying the untrusted region of data space 102 is deemed untrusted, while data occupying the trusted region of the data space is deemed trusted.

The techniques described below apply to two types of processing operations: 1) memory (i.e., data) access; and 2) code sequencing. A memory access truth table 200 according to one embodiment is shown in FIG. 2*a*. The truth table contains two columns: a code column and a data column. The code column refers to the type of code (i.e., trusted or untrusted) that is executed to cause the memory access. The data column refers to the type of data occupying the portion of the memory address space that is being accessed.

As is illustrated in memory access truth table 200, trusted code (i.e., an instruction stored in the trusted region of code space 100) is allowed direct access to any data stored in data space 102. Additionally, while untrusted code is allowed to directly access data in the untrusted region of data space 102, it cannot directly access data in the trusted region of the data space. Instead, a security policy is first applied to determine whether the memory access will be allowed.

A code sequence truth table 202 having similar logic is shown in FIG. 2*b*. In this instance, the second column (N) identifies the trust type of a current (i.e., Nth) instruction, while the first column (N-1) identifies the trust type of the instruction previous to the current instruction. The truth table logic is as follows. Any type of instruction following a trusted instruction is allowed to directly execute. Similarly, an untrusted instruction following another untrusted instruction is allowed to directly execute. However, a trusted instruction following an untrusted instruction is not allowed to execute without first applying a security policy. Depending on the results of the security policy, the instruction sequence may or may not be allowed to proceed.

The remaining description and Figures pertain to more specific implementations of the data access and code execution scheme illustrated in FIGS. 1, 2*a* and 2*b*. In general, the scheme can be implemented for any processor that enables data and code to occupy respective address spaces. For illustrative purposes, the following examples sometime define the use of specific named registers that may be used in one or more particular processors. However, it will be understood that this is not limiting, as the principles and teachings disclosed herein may be applied to processors employing different register configurations.

Figure 3A:
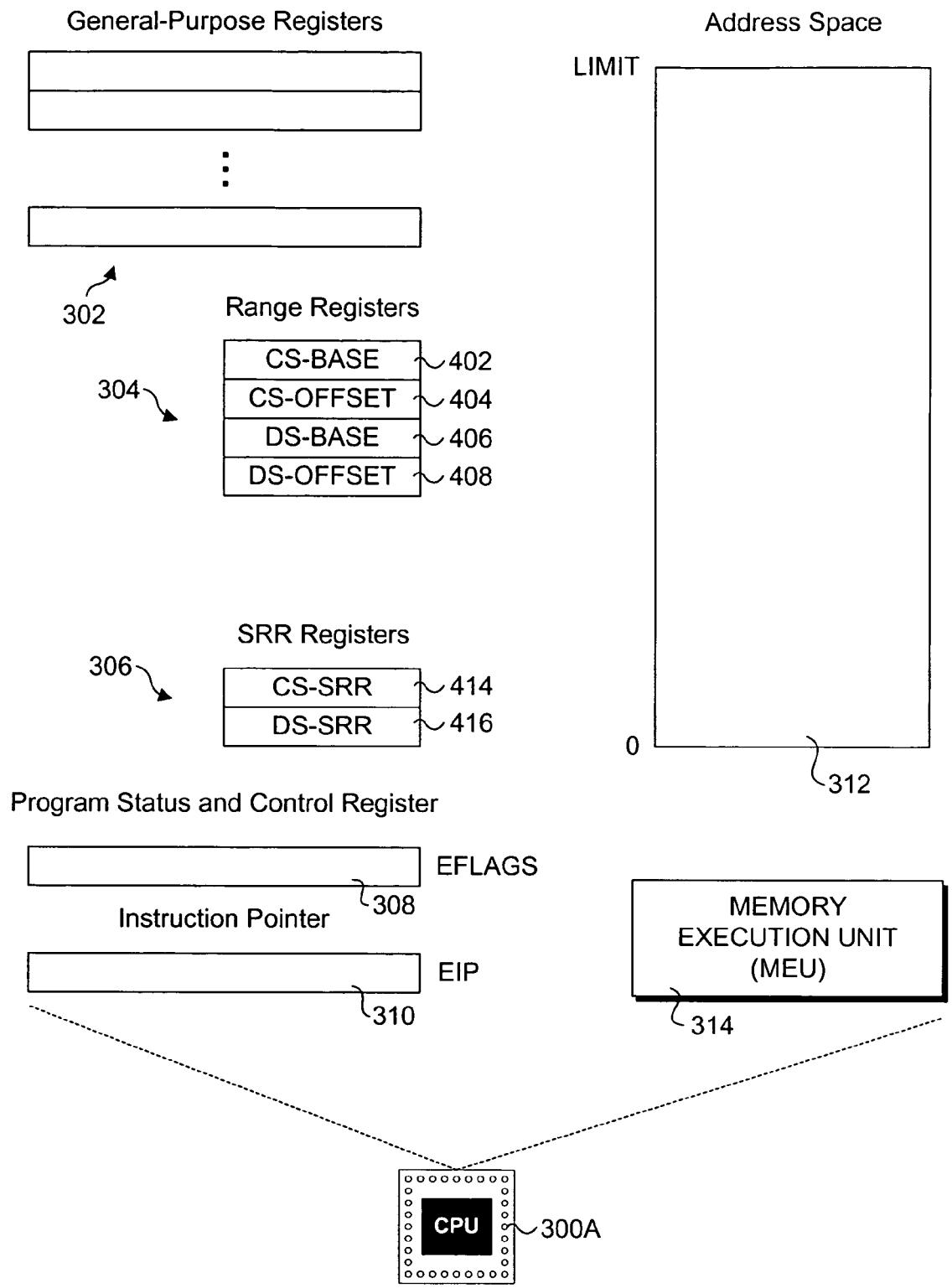
FIG. 3a is a schematic diagram of a processor architecture to support aspects of the memory partitioning scheme of FIG. 1 via a set of range registers and Safe Region Register (SRR) registers, according to one embodiment of the invention.

A portion of the basic execution architecture (pertaining to memory access and general instruction execution) for an exemplary processor 300 is shown in FIG. 3*a*. The architecture provides various basic program execution registers for use in general system and application programming. These registers are grouped as a set of general-purpose registers 302, a set of range registers 304, a set of Safe Region Register (SRR) registers 306, a program status and control register (EFLAGS) 308, and an EIP (instruction pointer) register 310. The General-purpose registers 302 are available for storing operands and pointers. The range registers 304 are used for mapping code and data spaces in a memory address space 312, as explained below in further detail. Bits in EFLAGS register 308 are used to report on the status of the program being executed and allows limited (application-program level) control of the processor. The EIP register 310 contains a pointer to the next instructions to be executed. In one embodiment, the architecture also includes a memory execution unit (MEU) 314.

The memory that a processor addresses on its bus is called physical memory. The physical memory is configured as a physical address space (also referred herein as the memory address space) having an address range that generally spans between a base address of zero and an upper limit address space that is dependent on the number of bits used to access the physical memory (when employing a physical addressing scheme). For example, the physical address space for 32-bit addressing ranges from zero to a maximum of $2^{32}-1$ (4 Gbytes). Similarly, the physical address space for 64-bit addressing ranges from zero to a maximum of $2^{64}-1$.

In some instances, an operating system (OS) or executive will use the processor's memory management facilities to access memory. In some embodiments, these facilities provide features such as segmentation and paging, which allow memory to be managed efficiently and reliably. In other instances, the underlying physical addressing is abstracted from the OS, wherein all memory address are referenced using a virtual address scheme. The memory translation operations to support these types of functionalities are performed, at least in part, by MEU 312. When employing processor 300's memory management facilities, programs do not directly address physical memory. Rather, they access memory using one or more memory models, such as flat, segmented, or real-address mode.

With a flat memory model, as depicted by address space 312, memory appears to a program as a single, continuous address space, called a linear address space. Code, data, and the procedure stack are all contained in this address space. The linear address space is byte addressable, with addresses running contiguously from 0 to the upper limit (e.g., $2^{32}-1$ for 32-bit and $2^{64}-1$ for 64-bit). An address for any byte in the linear address space is called a linear address.

Figure 3B:
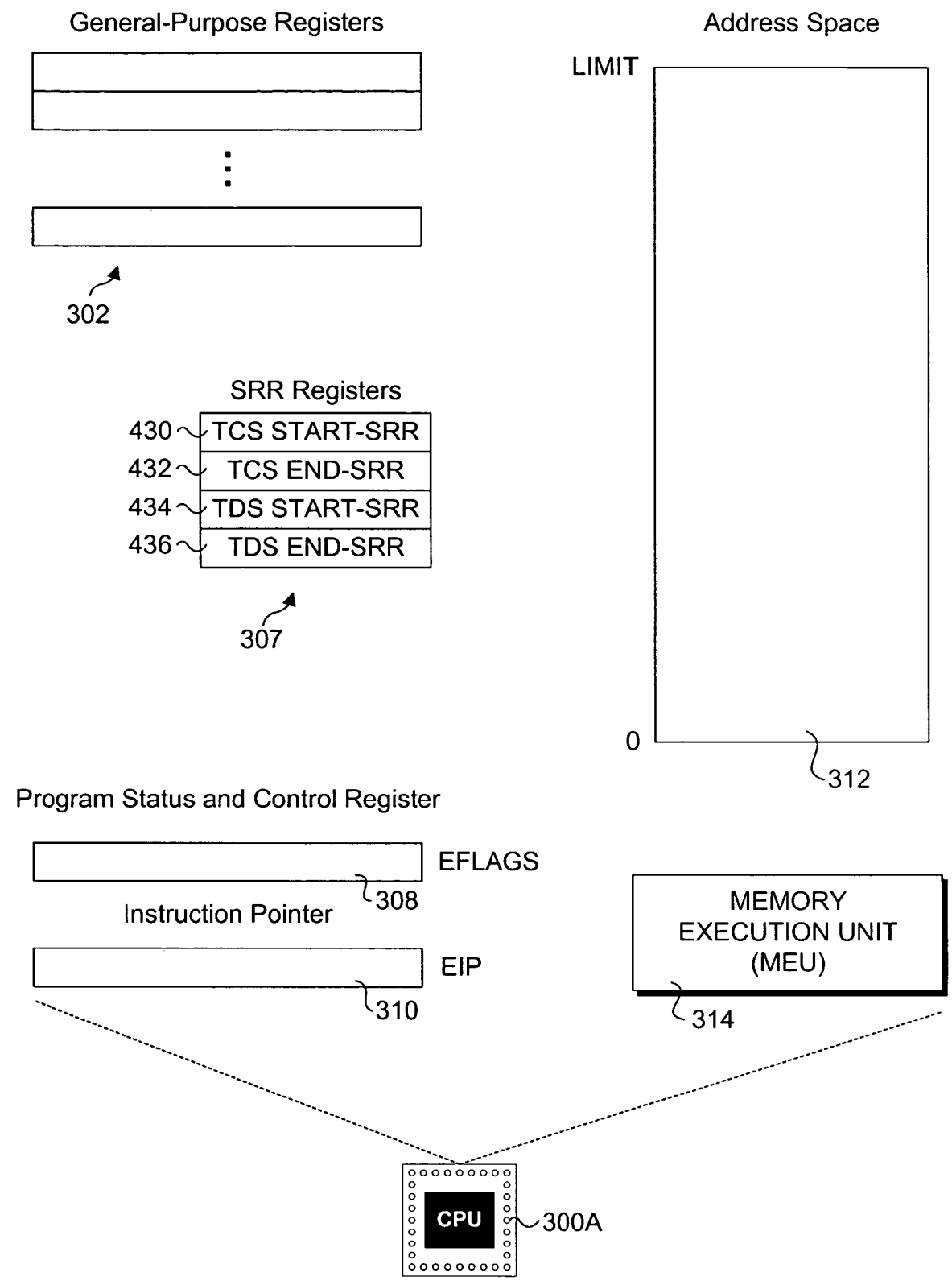
FIG. 3b is a schematic diagram of a processor architecture to support aspects of the memory partitioning scheme of FIG. 1 via a set of SRR registers, according to one embodiment of the invention.

A variation of the configuration of FIG. 3*a* is illustrated by the embodiment of FIG. 3*b*. In this embodiment, a processor 300B includes a set of SRR registers 307, which include respective pairs of start and end SRR registers that are used to define the address ranges for the code space and data space.

In addition to using flat memory models, embodiments may be implemented using segmented memory models. For example, processor 300C in FIG. 3*c* has an architecture configured to support segmented memory. The architecture is similar to that discussed above in FIG. 3*a*, except the range registers 304 have been replaced with segment registers 305.

In accordance with further aspects of the embodiments, techniques are now disclosed for safely managing execution and memory access for NUT software using both linear memory address models and segmented memory models. In general, the register facilities employed by the embodiments are illustrative of exemplary registers that may be employed to store information pertaining to operation of the embodiments. It will be understood that the functionality of the particular registers described herein may be facilitated by other types of registers, as well. Furthermore, both existing and extended processor architectures may be used to support management of safe execution and memory access operations described herein.

Figure 4A:
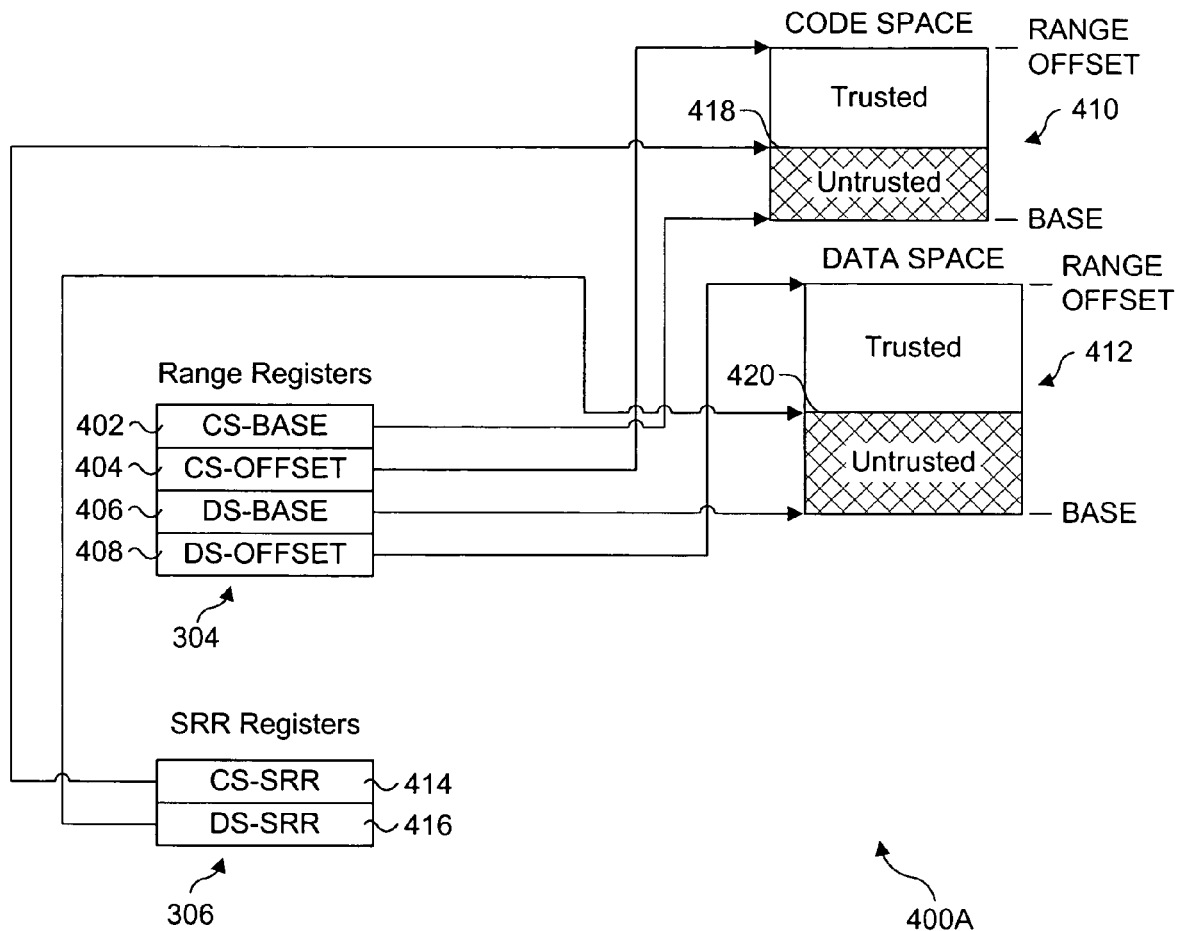
FIG. 4a is a schematic diagram illustrating further details of the architecture of FIG. 3a, wherein range registers are used to define the base and offset addresses for code and data spaces using linear addressing and the SRR registers are used to define the location of the boundary between the trusted and untrusted regions of the code and data spaces.

An architecture 400A depicted in FIG. 4*a* shows further details of how range registers 304 and SRR registers 306 of FIG. 3*a* are employed for mapping trusted and untrusted regions in the code and data spaces. (For purposes of clarity, the embodiments of FIGS. 4*a-c*, only show range or segment and/or SRR registers. It will be understood that these architecture embodiments further include the components shown in FIGS. 3*a* and 3*b*, as appropriate.) Range registers 304 include a code space (CS)-base register 402, a CS-offset register 404, a data space (DS)-base register 406, and a DS-offset register 408. As their names imply, CS-base register 402 stores the base address of a code space 410, while CS-offset 404 stores the range offset (i.e., size) of code space 410. Similarly, DS-base register 406 stores the base address of a data space 412, while DS-offset 408 stores the range offset (i.e., size) of data space 412.

In the embodiment of FIGS. 3*a* and 4*a*, the SRR registers 306 are used to store the location of the boundaries in the code and data spaces that delineate the trust regions from the untrusted regions. These include a CS-SRR register 414 and a DS-SRR register 416. The CS-SRR register 414 is used to define a trusted region offset 418 for the address space corresponding to a code space 608. Similarly, the DS-SRR register 416 is used to define a trusted region offset 420 for the address space corresponding to a data space 412. In general, the bit-width for CS-SRR register 414 and DS-SRR register 416 may vary, depending on the particular partitioning scheme and the address granularity desired. In one embodiment, CS-SRR register 414 and DS-SRR register 416 are 16-bit registers. Furthermore, the value stored in each of CS-SRR register 414 and DS-SRR register 416 may comprise a linear offset, a multiplied offset, or a pointer to a location at which a linear or multiplied offset is stored.

Figure 4B:
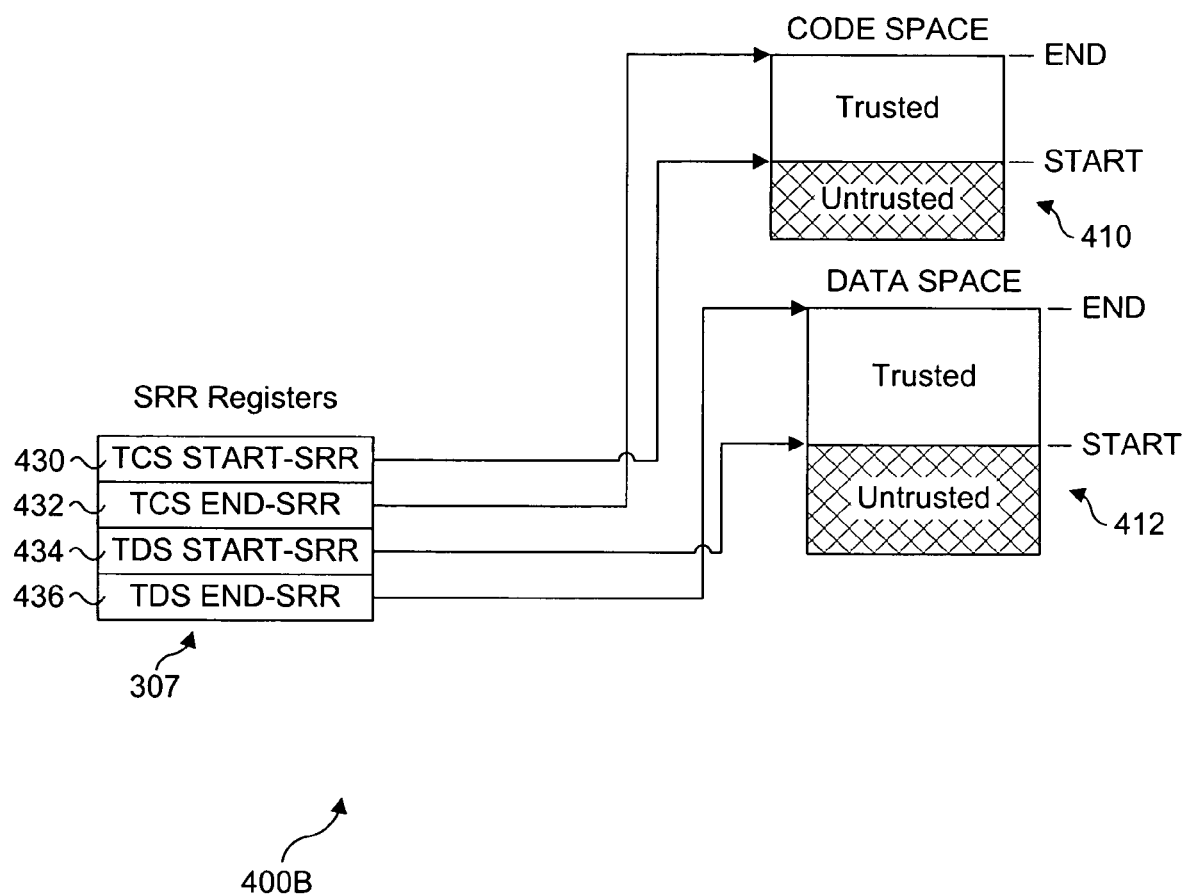
FIG. 4b is a schematic diagram illustrating further details of the architecture of FIG. 3b, wherein SRR registers are used to define the start and end addresses for the trusted regions of the code space and data space using linear addressing.

An architecture 400B depicted in FIG. 4*b* shows further details of how SRR registers 307 of FIG. 3*b* are employed for mapping trusted regions in the code and data spaces. The SRR registers include a trusted code space (TCS) start-SRR register 430 that is used to locate the start of the trusted region of code space 410, and a TCS end-SRR register 432 that is used to locate the end of the trusted code space region. Similarly, a trusted data space (TDS) start-SRR register 434 is used to locate the start of the trusted region of data space 412, and a TDS end-SRR register 436 is used to locate the end of the trusted data space region.

Figure 3C:
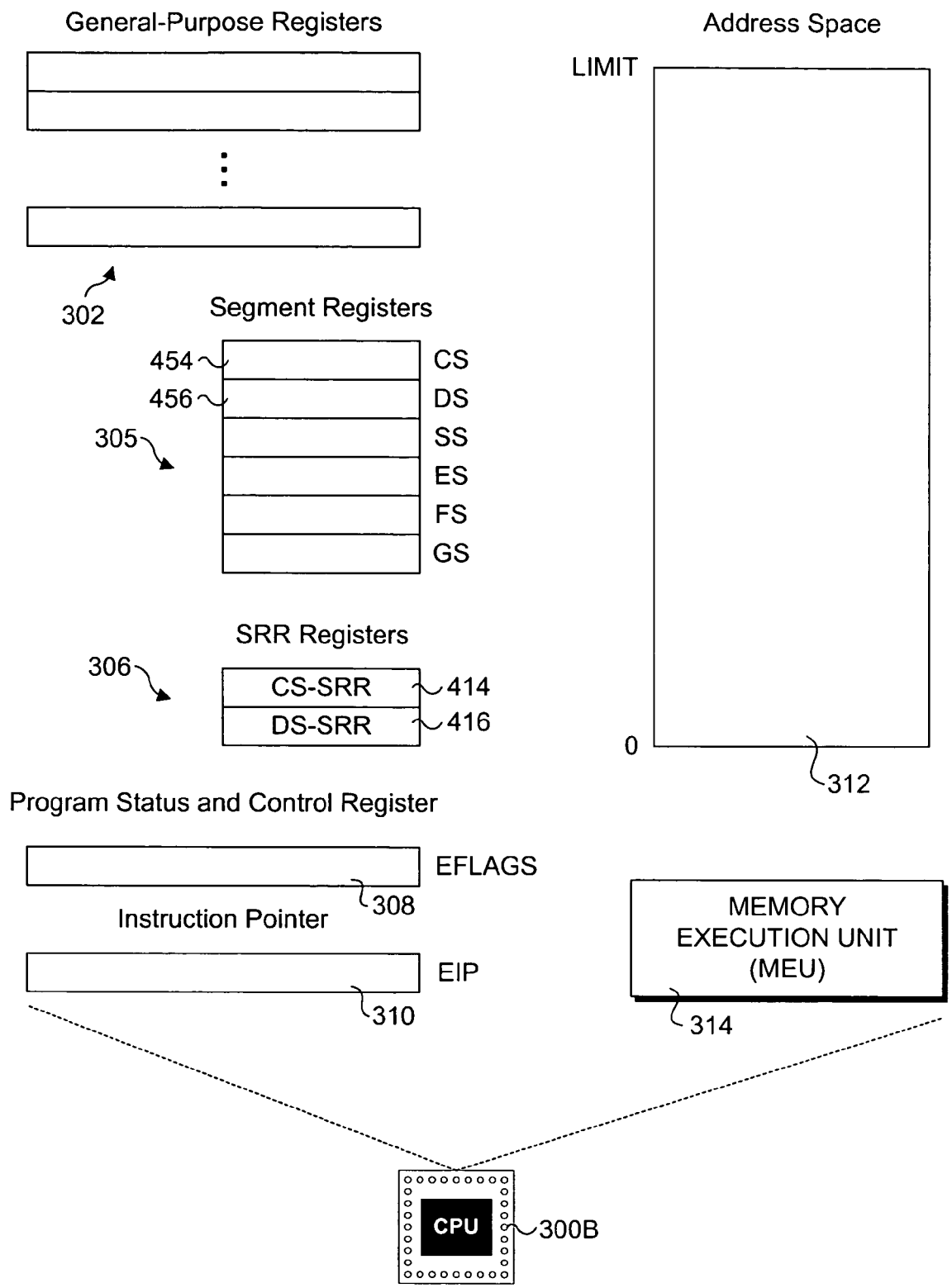
FIG. 3c is a schematic diagram of a processor architecture to support aspects of the memory partitioning scheme of FIG. 1 via a set of segment registers and SRR registers, according to one embodiment of the invention.
Figure 4C:
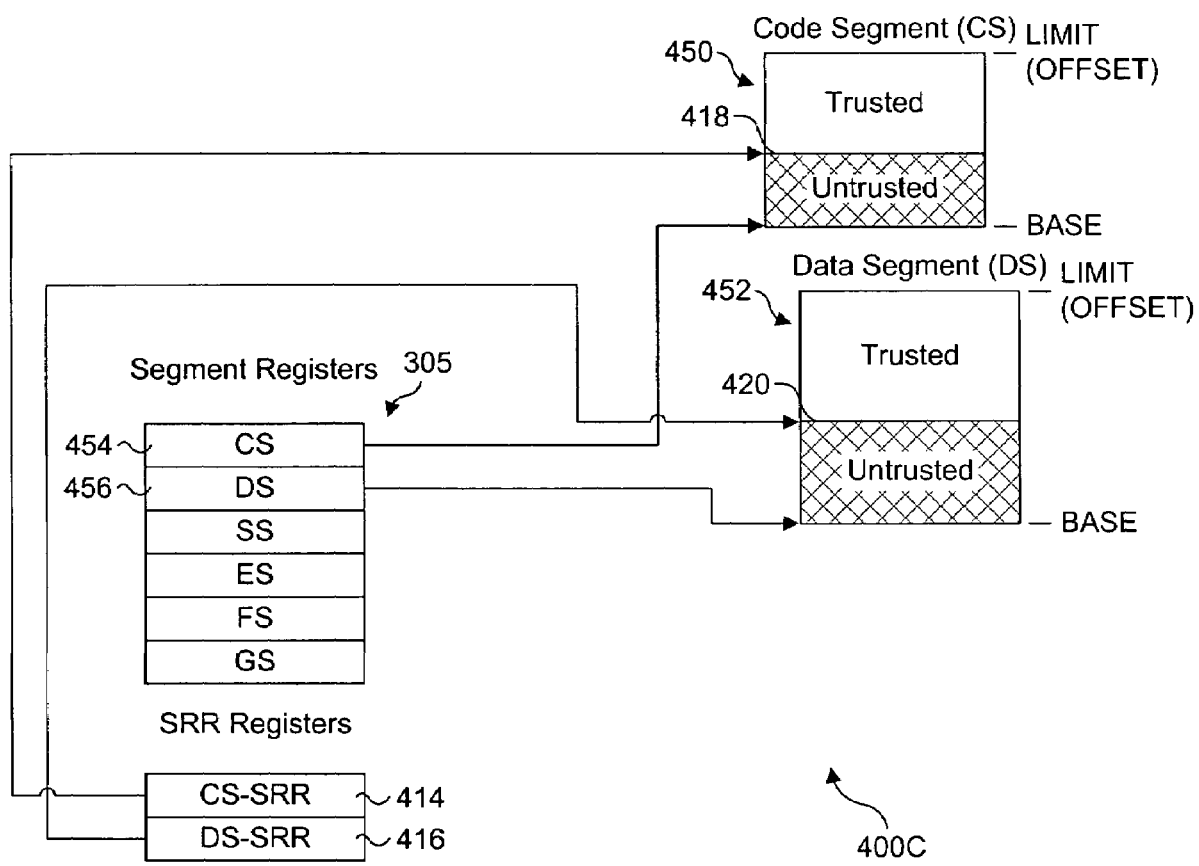
FIG. 4c is a schematic diagram illustrating further details of the architecture of FIG. 3c, wherein segment registers are used to define the base and offset addresses for code and data segments using segmented addressing and the SRR registers are used to define the location of the boundary between the trusted and untrusted regions of the code and data segments.

An architecture 400C illustrating further details of the segmented memory embodiment of FIGS. 3*c* is shown in FIG. 4*c*. This embodiment is roughly analogous to the embodiment of FIG. 4*a*, except that segment registers 305 are used in place of range registers 304. In the illustrated embodiment, the segment registers correspond to the segment registers of an IA-32 architecture processor, and include the code segment (CS), the data segment (DS), the stack segment (SS) and the other segment registers ES, FS, and GS. However, this is merely exemplary, as other segment register architectures may also be used.

With the segmented memory model, memory appears to a program as a group of independent address spaces called segments. When using this model, code, data, and stacks are typically contained in separate segments. To address a byte in a segment, a program issues a logical address, which consists of a segment selector and an offset. (A logical address is often referred to as afar pointer.) The segment selector identifies the segment to be accessed and the offset identifies a byte in the address space of the segment. In some embodiments, the segments can be defined to have different sizes and types.

Internally, all the segments that are defined for a system are mapped into the processor's linear address space. To access a memory location, the processor thus translates each logical address into a linear address. This translation is transparent to the application program.

When using the segmented memory model, each segment register is ordinarily loaded with a different segment selector so that each segment register points to a different segment within the linear address space. To access a segment not pointed to by one of the segment registers, a program must first load the segment selector for the segment to be accessed into a segment register.

The IA-32 segment registers (CD, DS, SS, ES, FS, and GS) hold 16-bit segment selectors. A segment selector is a special pointer that identifies a segment in memory. To access a particular segment in memory, the segment selector for that segment must be present in the appropriate segment register. When writing application code, programmers generally create segment selectors with assembler directives and symbols. The assembler and other tools then create the actual segment selector values associated with these directives and symbols.

Each of the segment registers is associated with one of three types of storage: code, data, or stack. For example, the CS register contains the segment selector for the code segment, where the instructions being executed are stored. The processor fetches instructions from the code segment, using a logical address that consists of the segment selector in the CS register and the contents of the EIP register. The EIP register contains the offset within the code segment of the next instruction to be executed.

Under the technique of the embodiments of FIGS. 3*c* and 4*c*, the code space is defined by a code segment 450 having a base address and a limit specified by an offset from the base address. Similarly, the data space is defined by a data segment 452 having a base address and a limit specified by an offset from the base address. The code segment (CS) register 454 is used to locate code segment 450. More particularly, the value in CS register 454 contains a pointer to a data structure (global descriptor table (GDT) entry—not shown) that contains the base address for code segment 450 and defines the limit (size) for the code segment). Similarly, the value in the data segment (DS) register 456 contains a pointer to a GDT entry that contains the base address and size for data segment 452.

As with the embodiment of FIGS. 3*a* and 4*a*, CS-SRR register 414 is used to locate the boundary between the trusted and untrusted regions of the code space by defining a trusted region offset 418 from the base address of code segment 450. Similarly, the DS-SRR register 416 is used to define a trusted region offset 420 from the base address of data segment 452.

In one embodiment, code having a given level of trust is allowed to directly access data having the same level of trust. Also, code with a higher level of trust is allowed to directly access to data with a lower level of trust. However, in one embodiment code having a lower level of trust is not allowed to directly access data having a higher level of trust. Rather, the execution thread is vectored to invoke a security policy component that is used to determine whether to allow a memory access or code sequence operations to continue.

Figure 5:
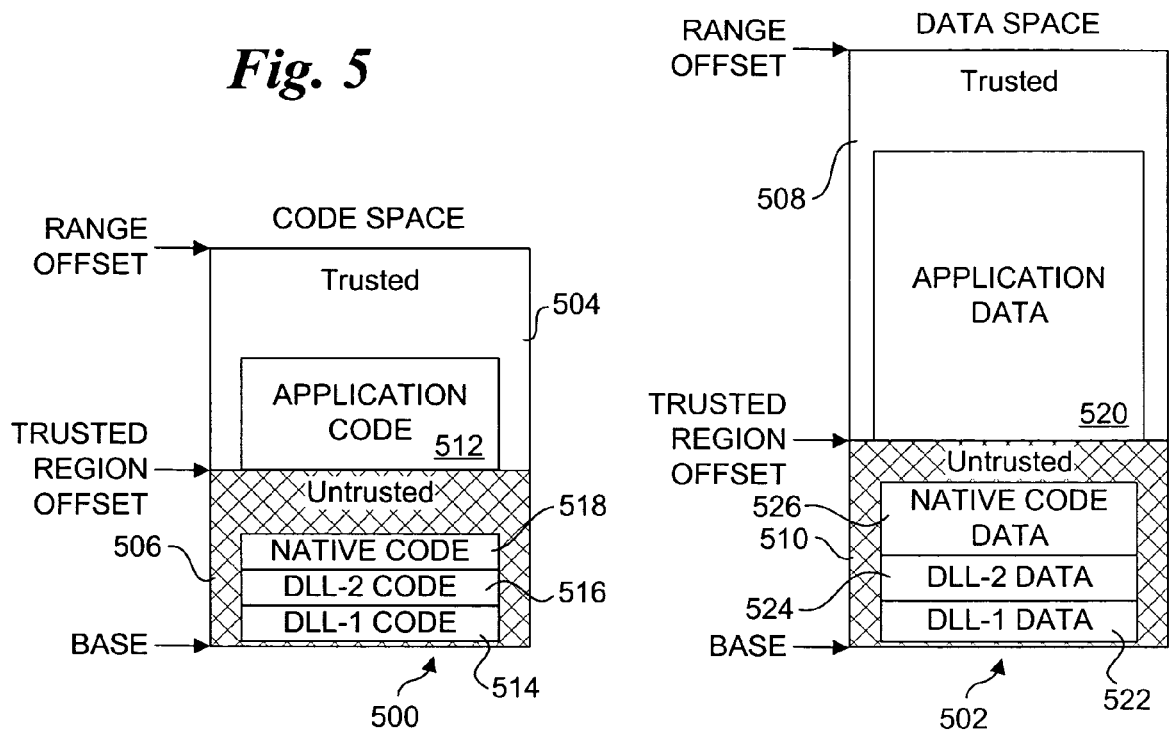
FIG. 5 is a schematic diagram illustrating an exemplary implementation of the memory-partitioning scheme of FIG. 1.

For the following examples, the code and memory usage scenario shown in FIG. 5 will be used. Under this configuration, memory is allocated for a code space 500 and a data space 502. The code space includes a trusted region 504 and an untrusted region 506. Similarly, the data space includes a trusted region 508 and an untrusted region 510.

As its name implies, trusted code (i.e. instructions) is loaded into a trusted region of the code space. Under one embodiment, trusted code will comprise code generated by a type-safe language, such as, but not limited to, Java or C#. For example, application code 512 may comprise a Java applet or application. Meanwhile, untrusted code is loaded into the untrusted region of the code space. Typically, untrusted code will comprise code that is written in an unsafe language, such as but not limited to C, C++ and assembler. Also, untrusted code may comprise code written by a third party, such as a dynamic link library. As illustrated in FIG. 5, the untrusted code in this example comprises code for two DLLs, including DLL-1 code 514, and DLL-2 code 516, and a native code module 518.

When an instance of an application is launched, the operating system will allocate code and data spaces for the instance. Under non-segmented memory, the code and data spaces will comprises portions of the linear address space for the system memory. Under memory segmentation, the operating system will allocate code and data segments for the instance. Thus, code space 500 will correspond to the code space (linear addressing) or code segment (segmented addressing) allocated to the application, while data space 502 will correspond to the data space (linear addressing) or data segment (segmented addressing) allocated to the application. Under the conventional scheme, the size of a code segment is specified, along with a base address for the code segment, using an entry in the global descriptor table (GDT) identified by the CS register value (i.e., CS segment selector). The logical address corresponding to the code segment limit is thus derived from the base address plus the size. Under one embodiment of the memory-partitioning techniques taught herein, a value for the trusted region offset for the code space is also allocated by the operating system, and stored in CS-SRR register 414, while a value for the trusted region offset for the data space is also allocated and stored in DS-SRR register 416. In one embodiment, an application framework (e.g., JVM) provides a means for defining what portions of the code segment are occupied by the trusted and untrusted regions.

For non-segmented memory implementations, the code and data spaces comprise linear portions of the physical memory address space. Accordingly, under the architecture of FIGS. 3a and 4a, data defining the start and end of the code and address spaces are loaded into the range registers 304. For example, the base address of the code space is loaded into CS-base register 402, while the range offset for the code space is loaded into CS-offset register 404. CS-SRR register 414 is then loaded with the trusted region offset for the code space, while DS-SRR register 416 is loaded with the trusted region offset for the data space.

Under the architecture of FIGS. 3b and 4b, data defining the start and end addresses of the trusted regions for the code and data spaces are loaded into SRR registers 307. For example, the start address for the code space is loaded into TCS start-SRR register 530, while the end address for the code space is loaded into TCS end-SRR register 532.

In a manner analogous to the allocation of code space memory, data operated on by trusted code is stored in the trusted region for the data space, as depicted by application data 520. Similarly, data operated on by untrusted code is stored in the untrusted region of the data space, as depicted by DLL-1 data 522, DLL-2 data 524, and native code module data 526.

Under various embodiments, the trusted region offset values stored in the SRR registers are employed to determine when the instruction being executed is located in a trusted or untrusted region. Similarly, the information in these registers is used to determine whether a memory access request corresponding to a data transaction involves accessing a trusted region or untrusted region of a data space. In one embodiment, an SAP (Safe Access Protection) trap is thrown in response to detection of an untrusted memory access event or code sequence. In one embodiment, determination of whether or not to throw an SAP trap is based on the truth table logic shown in FIGS. 2a and 2b.

Figure 6A:
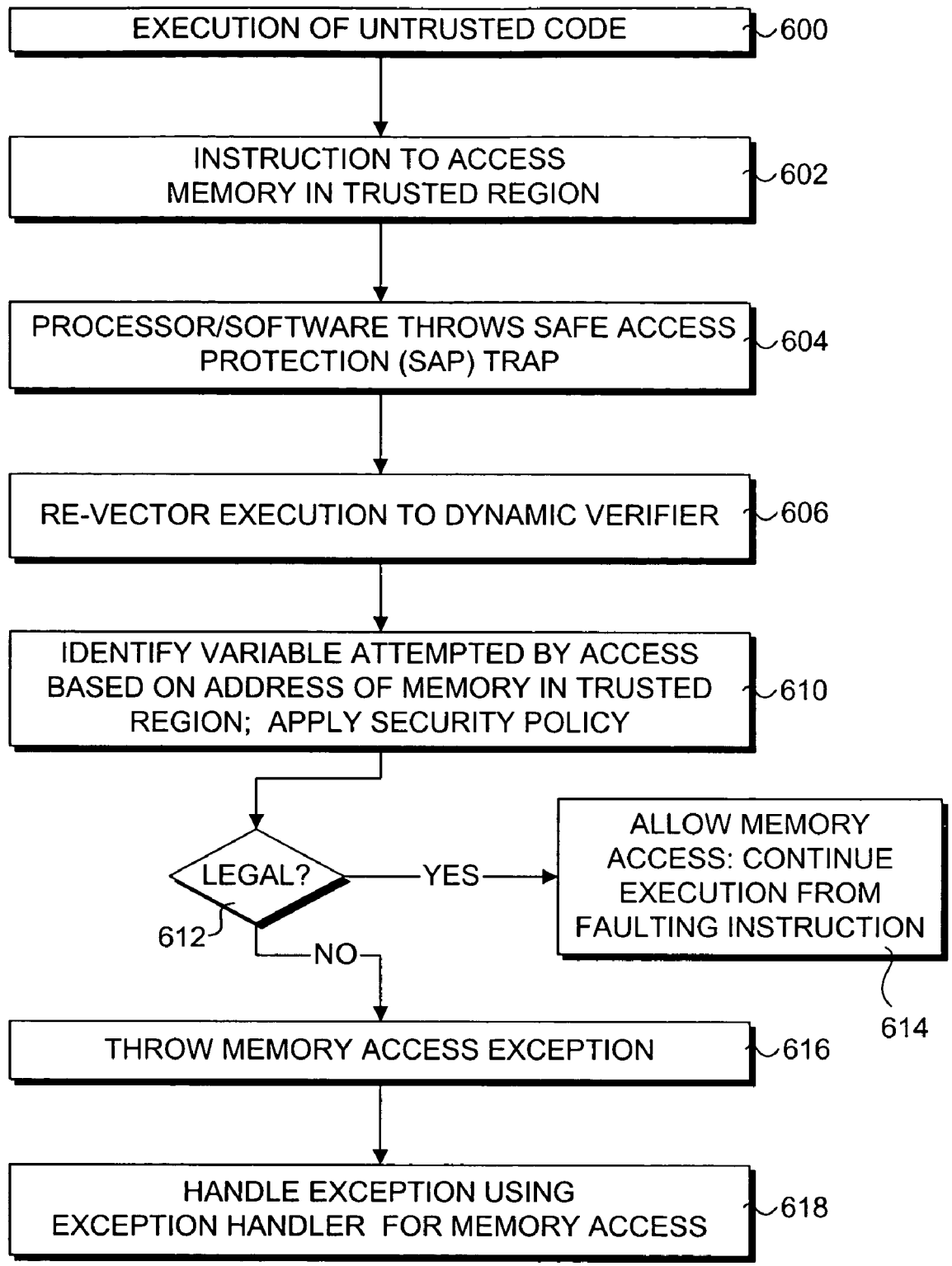
FIG. 6a is a flowchart illustrating operations and logic performed during an untrusted memory access process based on the memory-partitioning scheme, according to one embodiment of the invention.

A flowchart corresponding to operations that are performed in response to an untrusted memory access event, according to one embodiment, are shown in FIG. 6a. A schematic diagram illustrating how the operations and logic of the flowchart are implemented, according to one embodiment, are shown in FIG. 4b.

The process begins in a block 600, wherein untrusted code is executing. For example, suppose that instructions comprising a portion of native code module 518 are executing. Under the terminology used herein, code occupying an untrusted region of the code space is called an "unsafe" instruction. Similarly, code occupying a trusted region of the code space is called a "safe" instruction. When untrusted code is executing, EIP register 310 is loaded with a pointer to an unsafe instruction, such as depicted by an unsafe instruction 601 in FIG. 6b. (For convenience, instructions will be referenced herein as if loaded into the EIP register. It will be understood that the EIP register actually contains a pointer to the next instruction to execute within the code segment.) It doesn't matter what type of operation the instruction performs, the definition of whether it is safe or unsafe is purely dependant on which region it is stored in.

In a block 602, a pointer to an unsafe instruction 603 to access memory in a trusted region is loaded into EIP register 310. For example, suppose that an instruction in native code module 518 corresponds to a memory access having an address that is mapped to application data 520, which occupies trusted region 508 of data space 502. In one embodiment, as each instruction pointer is loaded into the EIP register, a check is performed to determine whether the instruction corresponds to code stored in a trusted region or untrusted region of the code space. In one embodiment, this is performed by comparing the offset of the segmented address of the instruction (i.e., base segment address+offset) to the trusted region offset value stored in the CS-SRR register. If the offset is greater than the CS-SRR register value, the instruction is trusted. If not, the instruction is untrusted.

In another embodiment corresponding to the scheme of FIGS. 3b and 4b, a check is made to determine if the unsafe instruction is located within the trusted region 504 of code space 500. The address of the instruction is compared with the start and end addresses for the trusted region of the code space to determine if it falls within the address range assigned to the trusted code space region.

In one embodiment, processing state information corresponding to code and memory usage is maintained in EFLAGs register 308. Under the conventional IA-32 architecture, bits 1, 3, 5, 15, and 22 through 31 of this register are reserved. Accordingly, any of these reserved bits can be implemented in an extended IA-32 architecture without affecting normal IA-32 operations. In one embodiment, bit 30 is used to store instruction trust information, while bit 29 is used to store memory access trust information.

Figure 6B:
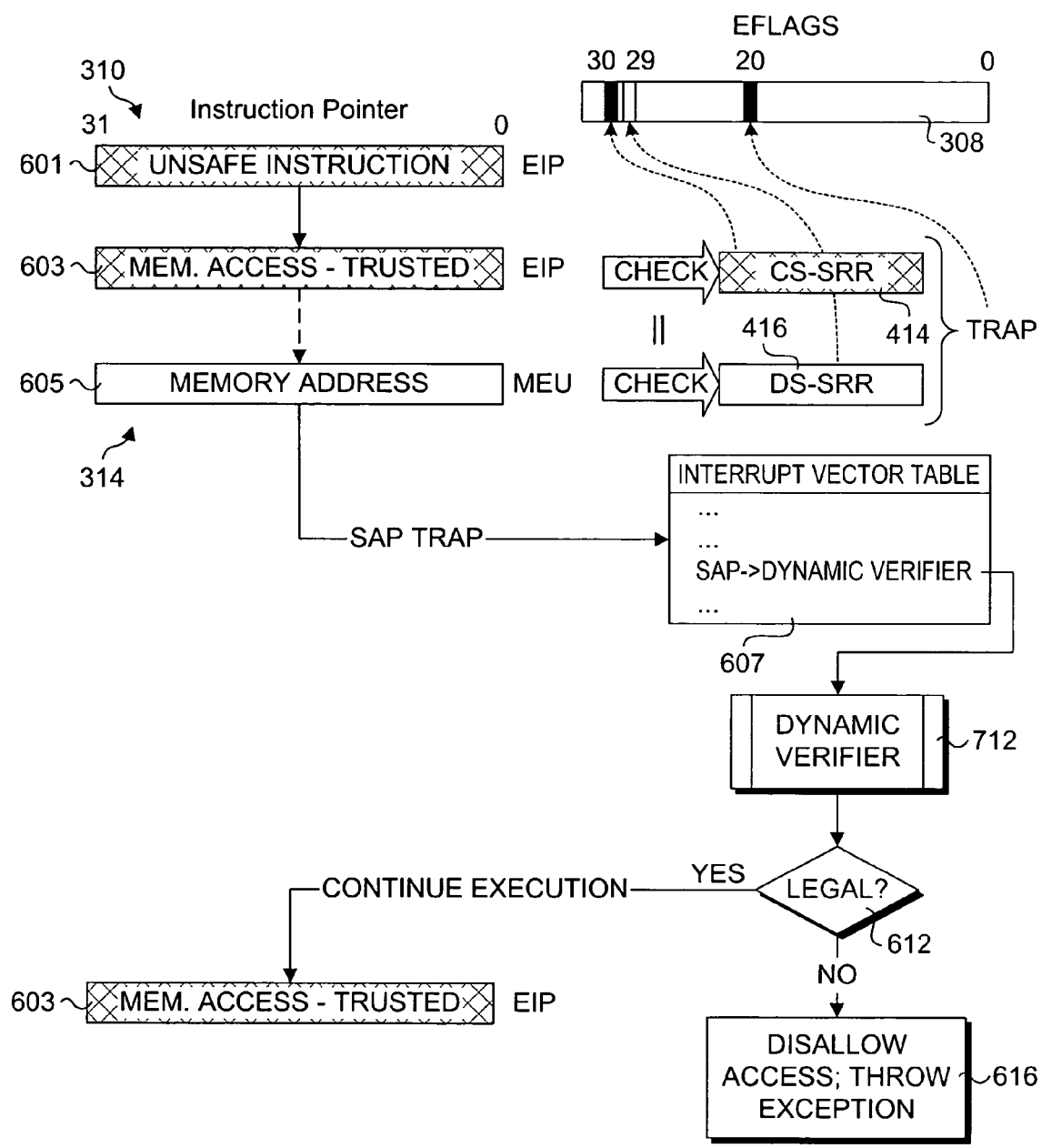

As shown in FIG. 6b, when the pointer to unsafe instruction 603 is loaded, a check of CS-SRR register 414 is performed to determine whether the next instruction is considered safe or unsafe. In response, bit 30 in EFLAGs register 308 is either set (unsafe) or cleared (safe).

As depicted by the continuing processing of FIG. 6b, various embodiments of the architectures of FIGS. 3a-c employ a pipelined architecture. What this does is to allow multiple pipelined operations to be carried out in parallel. One such operation pertains to memory access. When a memory access instruction is processed, the logical address for the memory is provided to MEU 314, which translates the logical address into its physical address so that it may be accessed by the processor from address space 312. As part of this process, in one embodiment the memory address 605 corresponding to the data access request is checked against the trusted region offset value for the data space stored in DS-SRR register 414. If the address corresponds to an address mapped to an untrusted region of the data space, bit 29 of EFLAGs register 308 is set; otherwise the address corresponds to a trusted region of the data space, causing bit 29 to be cleared. In accordance with the embodiments of FIGS. 3b and 4b, the address for the data access request is compared with the start and end address for the trusted region in the data space to determine whether the requested data is present in the trusted region of the data space.

In one embodiment, the combination of a [1,0] value for bits 30 and 29 produces an SAP trap. In one embodiment, the trap is signaled by observing the combination of the bit 30 and 29 values. In another embodiment, the trap is signaled by setting the virtual interrupt pending (VIP) flag (bit 20) of EFLAGs register 304. In either case, the object is to generate a virtual interrupt. The operation of throwing the SAP trap is shown in a block 604 of FIG. 6a.

In general, modern processors support two types of interrupts: physical interrupts and virtual interrupts. Physical interrupts correspond to interrupts that are generated by hardware devices coupled to the processor (via appropriate buses). This enables the hardware device to request service by the processor. Virtual interrupts correspond to interrupts that are generated by software, i.e., in response to execution of code instructions.

In one embodiment, the processor architecture supports registration of virtual interrupt handlers, and stores corresponding instruction re-vectoring information in a virtual interrupt vector table 607. Each entry in the virtual interrupt vector table maps a virtual interrupt event type to the first instruction of a corresponding interrupt handler. Under the current example, the interrupt event type is an SAP trap, and the interrupt handler is called the "Dynamic Verifier." Thus, in response to the SAP trap in block 604, the execution thread is re-vectored in a block 606 to the dynamic verifier by loading the starting address of the Dynamic Verifier into EIP register 310.

In general, the Dynamic Verifier should be a trusted module. As such, it should be registered by a trusted component. In one embodiment, the dynamic verifier is registered by the trusted part of the application. This may be done by storing the address of the first instruction of the Dynamic Verifier at a known offset from the start of the trusted data space. The processor re-vectors execution to the Dynamic Verifier when a SAP trap is generated, without changing privilege levels. In another embodiment, the dynamic verifier is registered by the operating system using a mechanism similar to an interrupt descriptor table (IDT). When execution is re-vectored to the dynamic verifier, the processor may change privilege levels.

Figure 7:
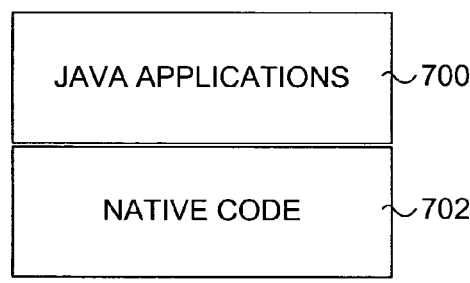
FIG. 7 is a schematic diagram of an extended Java framework, which further includes a Dynamic Verifier that is used for applying a security policy that determines whether or not certain memory and code accesses are allowed.
Figure 7:
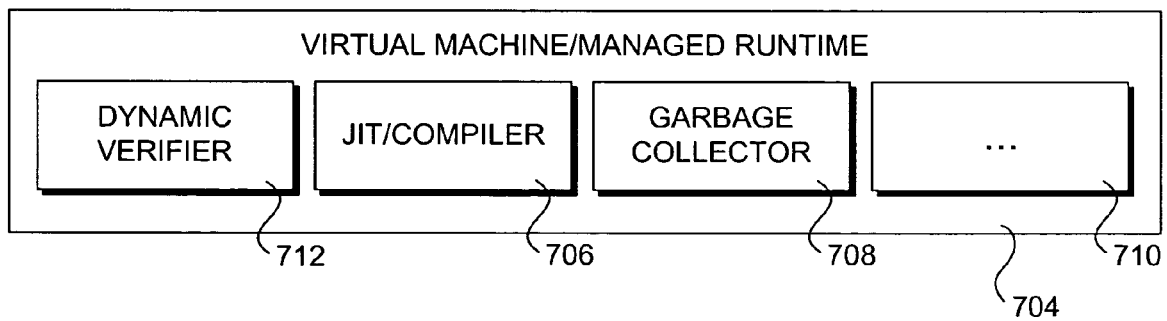

In yet another embodiment, the Dynamic Verifier is part of a virtual machine, and is registered in conjunction with loading the virtual machine. For example, FIG. 7 shows a processing framework corresponding to a Java-based embodiment. The framework includes code partitioned into trusted Java applications 700 and untrusted native code 702. The execution of the Java application and native code is managed by a Java virtual machine (JVM) 704, which, in turn, runs on a processor. As is well-known in the art, the virtual machine is implemented via several components, such as a just-in-time (JIT) compiler 706 and a garbage collector 708. Other standard JVM components are depicted by a block 710. JVM 704 also includes a Dynamic Verifier 712. In one respect, the Dynamic Verifier comprises a hardware-enabled extension to the SecurityManager class in Java.

Returning to the flowchart of FIG. 6a, in a block 610 the Dynamic Verifier is given the address of the variable that the untrusted code was trying to access. The Dynamic Verifier then decides if the access should be allowed based on a pre-defined security policy that it enforces. As depicted by a decision block 612, if the access is legal, then execution continues from the SAP faulting instruction, allowing the memory to be accessed in accordance with a block 614. If the access is determined by the security policy to be illegal, a memory access exception is thrown in a block 616. This exception is then handled by using an appropriate exception handler in a block 618.

Figure 8:
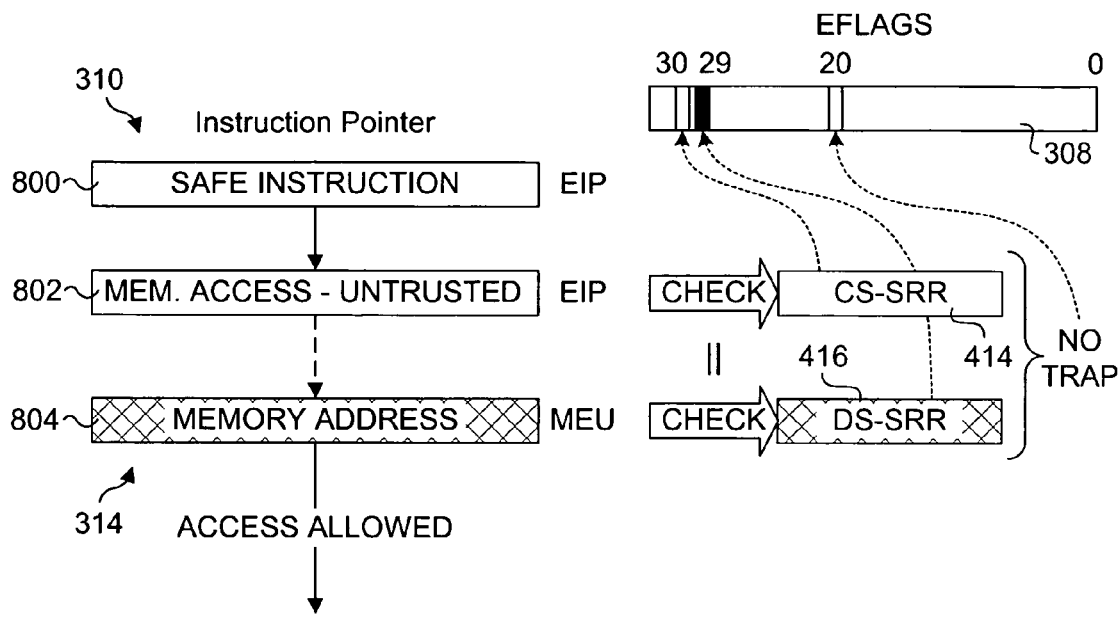
FIG. 8 is a schematic diagram of an allowable memory access involving a safe instruction accessing untrusted memory, according to one embodiment of the invention.
Figure 9:
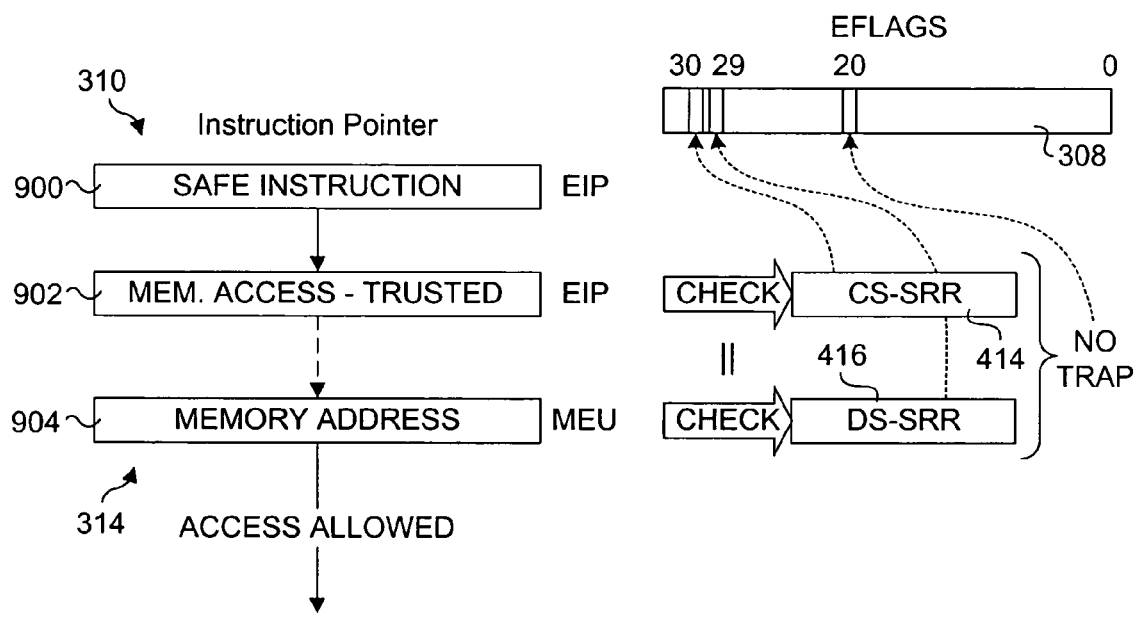
FIG. 9 is a schematic diagram of an allowable memory access involving a safe instruction accessing trusted memory, according to one embodiment of the invention.
Figure 10:
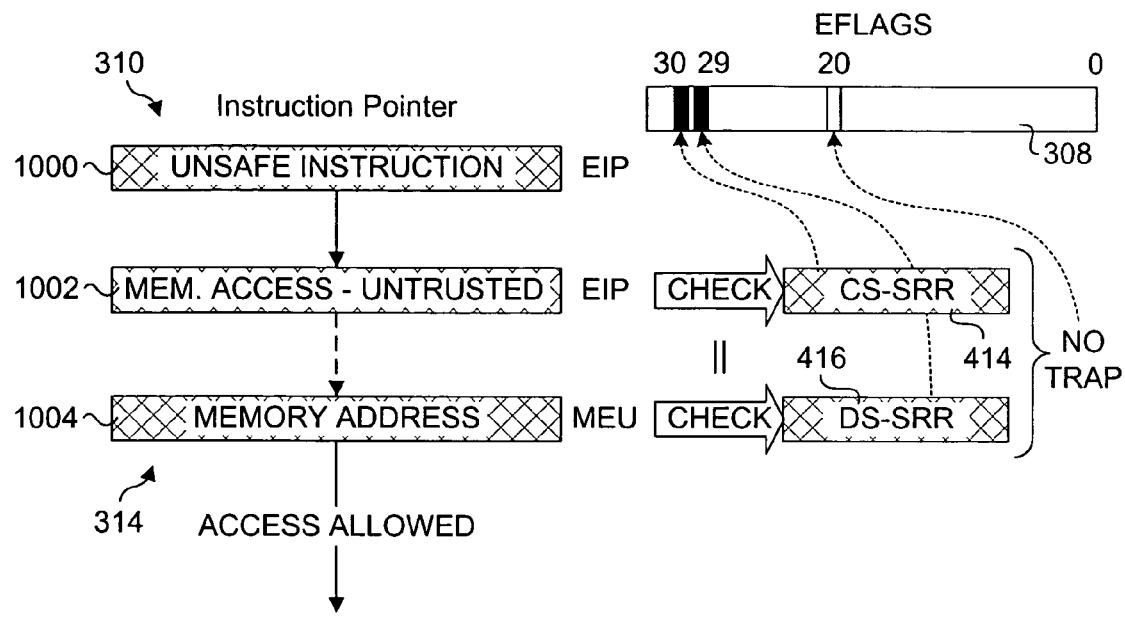
FIG. 10 is a schematic diagram of an allowable memory access involving a unsafe instruction accessing untrusted memory, according to one embodiment of the invention.

Examples of allowable memory access processes are shown in FIGS. 8, 9, and 10. For example, FIG. 8 illustrates a scenario where trusted code is allowed to access data stored in an untrusted region of a data space. The process begins with execution of safe instructions corresponding to an application or module stored in a trusted portion of the code space, such as application code 512. This is depicted by a safe instruction 800. The next instruction to be loaded into EIP register 310 is a safe instruction 802 corresponding to a memory access to data stored in the untrusted region 510 of data space 502. In response, the CS-SRR register 414 check indicates the instruction is safe, and bit 30 of EFLAGs register 308 is cleared. Subsequently, in accordance with the memory address operation 804 performed by MEU 314, the DS-SRR register 416 check indicates the memory access is to an address in an untrusted region of the data space. Accordingly, bit 29 of EFLAGs register 308 is set. In accordance with the truth table of FIG. 2a, a value of [0,1] in registers 30 and 29 corresponds to an allowable operation. Thus, VIP bit 20 is cleared, an SAP trap is not thrown, and the memory access operation is allowed to proceed.

In the scenario depicted in FIG. 9, trusted code is allowed to access data stored in a trusted region of the data space. The process begins with execution of safe instructions corresponding to an application or module stored in a trusted portion of the code space, as depicted by a safe instruction 900. The next instruction to be loaded into EIP register 310 is a safe instruction 902 corresponding to a memory access to data stored in the trusted region 508 of data space 502. In response, the CS-SRR register 414 check indicates the instruction is safe, and bit 30 of EFLAGs register 308 is cleared. Subsequently, in accordance with the memory address operation 904 performed by MEU 314, the DS-SRR register 416 check indicates the memory access is to an address in a trusted region of the data space. Accordingly, bit 29 of EFLAGs register 308 is also cleared. In accordance with the truth table of FIG. 2a, a value of [0,0] in registers 30 and 29 corresponds to an allowable operation. Thus, an SAP trap is not thrown, and the memory access operation is allowed to proceed.

In the scenario depicted in FIG. 10, untrusted code is allowed to access data stored in an untrusted region of the data space. The process begins with execution of unsafe instructions corresponding to a module (e.g., native code or a DLL) stored in an untrusted portion of the code space, as depicted by an unsafe instruction 1000. The next instruction to be loaded into EIP register 310 is an unsafe instruction 1002 corresponding to a memory access to data stored in the untrusted region 510 of data space 502. In response, the CS-SRR register 414 check indicates the instruction is unsafe, and bit 30 of EFLAGs register 308 is set. Subsequently, in accordance with the memory address operation 1004 performed by MEU 314, the DS-SRR register 416 check indicates the memory access is to an address in an untrusted region of the data space. Accordingly, bit 29 of EFLAGs register 308 is also set. In accordance with the truth table of FIG. 2*a*, a value of [1,1] in registers 30 and 29 corresponds to an allowable operation. Thus, an SAP trap is not thrown, and the memory access operation is allowed to proceed.

Figure 11A:
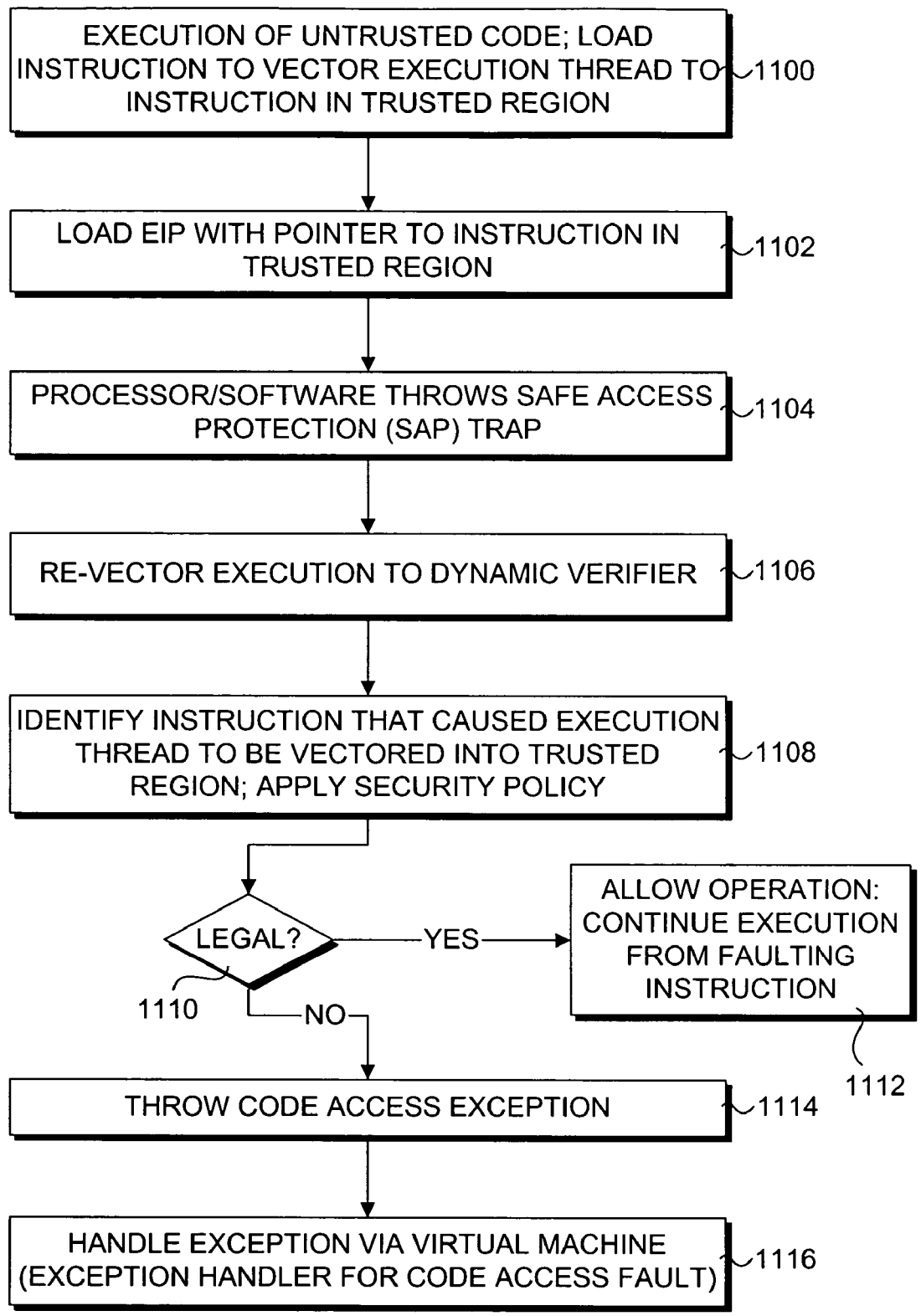
FIG. 11a is a flowchart illustrating operations and logic performed during an untrusted code sequence process based on the memory-partitioning scheme, according to one embodiment of the invention.
Figure 11B:
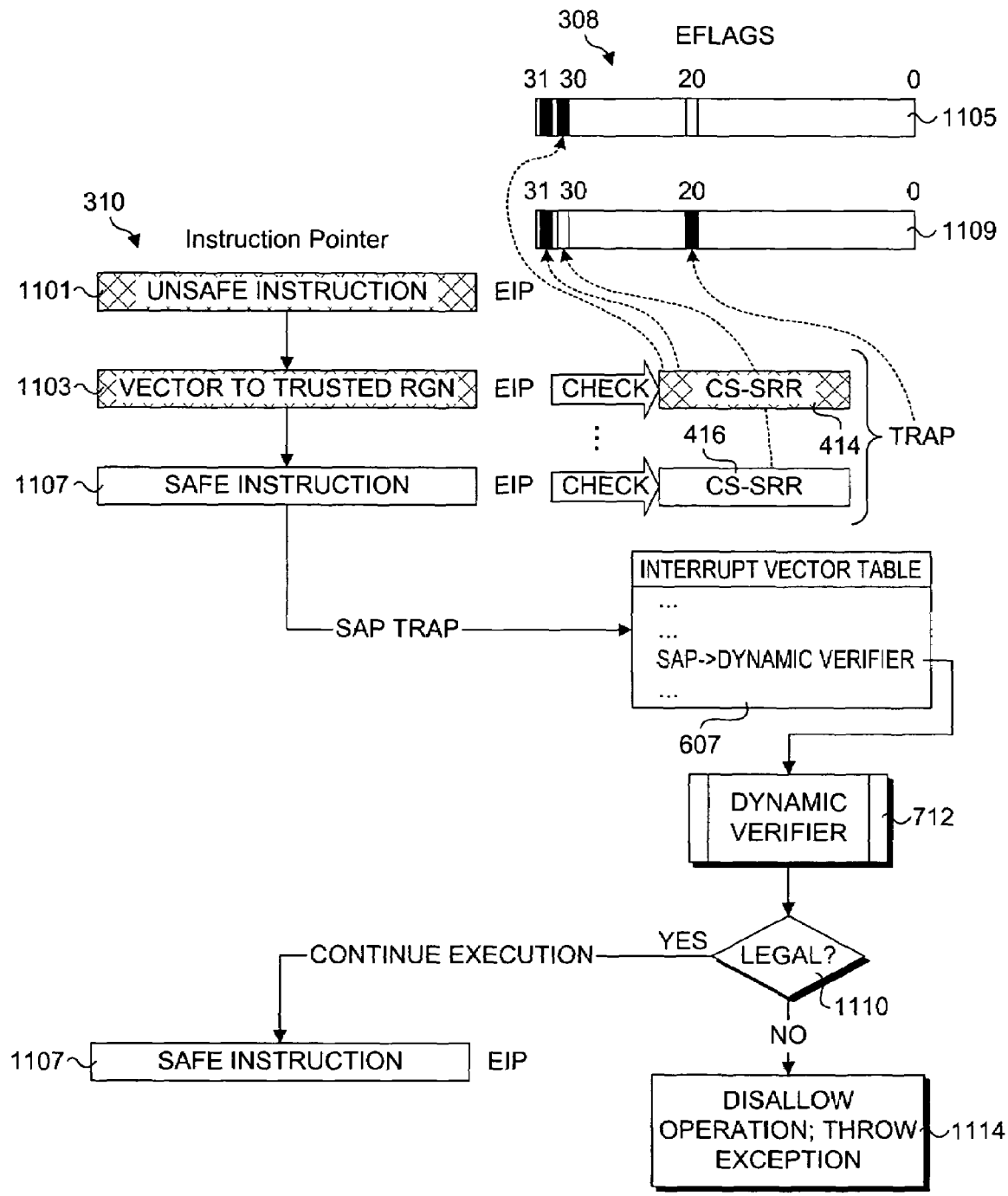

As discussed above, certain code sequences may also lead to SAP traps. For example, in one embodiment a sequence from untrusted code to trusted code is not allowed to proceed without first applying a security policy. A flowchart and schematic diagram corresponding to this code sequence is shown in FIGS. 11*a* and 11*b*, respectively.

The process begins in a block 1100 with execution of untrusted code comprising an unsafe instruction 1101. Continuing with block 1100, an unsafe instruction 1103 that causes the execution thread to be vectored to code in the trusted region is loaded into EIP register 310. For example, this situation could result from a call or jump to an instruction in the trusted region, or might simply result from a return instruction that is issued at the completion of an untrusted native code procedure or subroutine. As before, the result of the CS-SRR register 414 check is indicated by the bit 30 value of EFLAGs register 308. In addition to the CS-SRR register 414 check value for the current instruction, the CS-SRR register check value for the instruction immediately prior to the current instruction is stored in EFLAGs register 308. In one embodiment, this value is stored in bit 31 of the EFLAGs register.

This produces an EFLAGs register configuration 1105 corresponding to a time-instance immediately after the pointer to unsafe instruction 1103 is loaded into EIP register 310. In this EFLAGs register configuration, both of bits 31 and 30 are set, corresponding to an execution sequence of two unsafe instructions. In accordance with the code sequence truth table of FIG. 2*b*, if the values for bits 31 and 30 are [1,1] the operation is allowed, and the VIP flag corresponding to bit 20 of EFLAGs register 308 is cleared. This operation is allowed to proceed.

Continuing with the execution sequence, a vectoring to an instruction in the trusted region will cause the pointer for the next instruction to be loaded into EIP register 310, which will point to an address in the trusted region of the code space. This instruction is depicted as a safe instruction 1107. Again, upon loading of this instruction pointer into EIP register 310, the CS-SRR register check is performed. In this instance, the instruction is in the trusted region, so bit 30 is cleared. Just prior to updating the value for bit 30, the previous value of bit 30 is shifted left one bit, to bit 31. As discussed above, this represents the code trust type of the previous instruction. This results in an EFLAGs register configuration 1109.

Under this configuration, the values for bits 31 and 30 are [1,0]. As defined by the code sequence truth table of FIG. 2*b*, this represents an untrusted sequence requiring security policy evaluation. Thus, the VIP bit 20 is set to notify the processor of a pending SAP trap, as depicted in a block 1104 of the flowchart of FIG. 11*a*. In response to the SAP trap, operations are performed in a manner generally analogous to those discussed above for the untrusted memory access.

First, in a block 1106, the execution thread is re-vectored to Dynamic Verifier 712. In a block 1108, the Dynamic Verifier applies its security policy for code sequences. In one embodiment, the instruction that caused the execution thread to be vectored to the trusted region is identified. For example, an action initiated by an untrusted DLL or native code module might attempt to call or jump to an instruction in the trusted region. This may generally lead to problematic results, so this type of access might be denied under one embodiment of the security policy. At the same time, the vectoring might simply result for a return from a called subroutine or procedure comprising native code or a DLL. Under this circumstance, the vectoring back into the trusted region of the code space is expected, and represents a normal code sequence. Under one embodiment, this type of code sequence is legal.

If the sequence is deemed legal, as depicted in a decision block 1100, the instruction sequence is allowed to proceed, continuing from the faulting instruction. If the sequence is illegal, a code access exception is thrown in a block 1114, and the exception is handled by an appropriate exception handler in a block 1116.

Figure 12:
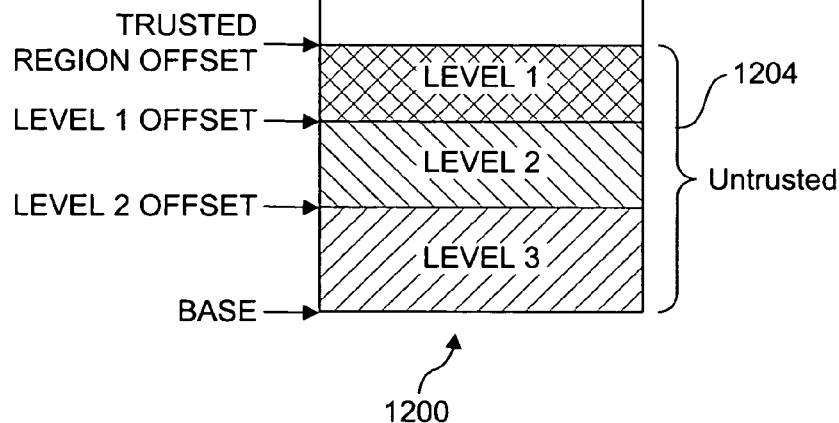
FIG. 12 is a schematic diagram of a memory-partitioning scheme including further trust granularity of the untrusted region, according to one embodiment of the invention.

In addition to memory-partitioning schemes that divide code and data spaces into trusted and untrusted regions, additional trust granularity may be achieved by further partitioning the untrusted region into sub-regions having different levels of trust. For example, FIG. 12 shows a memory-partitioning scheme for a code space 1200 that includes a trusted region 1202 and an untrusted region 1204. The boundary between these regions is defined by the trusted region offset in a similar manner to that used in the embodiments discussed above. However, the trusted region is further partitioned into three sub-regions having different levels of trust: Level 1, Level 2, and Level 3. In the illustrated embodiment, Level 1 pertains to the most trusted code in untrusted region 1204, with Level 2 code being less trusted and Level 3 code being the least trusted.

In one embodiment, from the perspective of the processor, the operations to support the embodiment of FIG. 12 are identical to those discussed above—it is unaware of the further partitioning of the untrusted region. Rather, the partitioning is effectuated by software, or more specifically, the Dynamic Verifier. When the execution thread is handed off to the Dynamic Verifier, it ascertains which trust level the faulting instruction is assigned to by performing an address location check. In one embodiment, the Dynamic Verifier (and/or application or operating system) maintains an untrusted region lookup table that defines offsets for each sub-region of the untrusted region occupied by a corresponding level. For instance, under the configuration for code space 1200, the lookup table would maintain level 1 and level 2 offsets.

Under this scheme, the Dynamic Verifier can enforce a different access policy for code residing at different trust levels. Since the Dynamic Verifier is a software entity, the scheme is very flexible. The granularity of the levels of trust may be chosen by the software designer, enabling a continuum of trust regions to be supported. In addition, a similar partitioning scheme can be applied for data spaces. As before, this further partitioning is transparent to processor operations, but rather is handled by the Dynamic Verifier.

Figure 13:
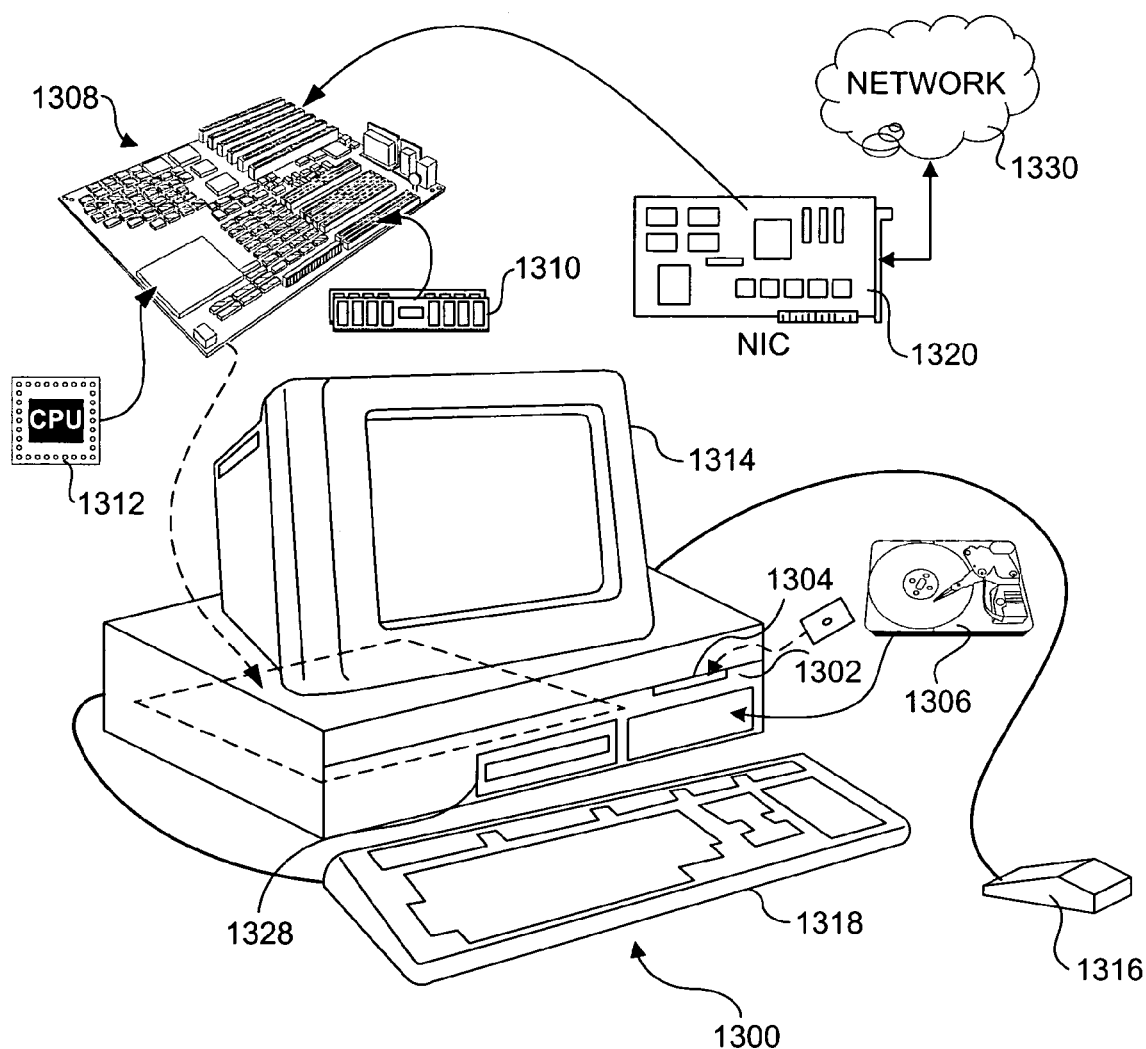
FIG. 13 is a schematic diagram of an exemplary computer system on which embodiments of the invention may be practiced.

FIG. 13 illustrates an embodiment of an exemplary computer system 1300 to practice embodiments of the invention described above. Computer system 1300 is generally illustrative of various types of computer devices, including personal computers, laptop computers, workstations, servers, etc. For simplicity, only the basic components of the computer system are discussed herein. Computer system 1300 includes a chassis 1302 in which various components are housed, including a floppy disk drive 1304, a hard disk 1306, a power supply (not shown), and a motherboard 1308. Hard disk 1306 may comprise a single unit, or multiple units, and may optionally reside outside of computer system 1300. The motherboard 1308 includes memory 1310 coupled in communication with one or more processors 1312 via appropriate busses and/or chipset components.

Memory 1310 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like. Processor 1312 may be a conventional microprocessor including, but not limited to, a CISC (complex instruction set computer) processor, such as an Intel Corporation x86, Pentium®, or Itanium® family microprocessor, a Motorola family microprocessor, or a RISC (reduced instruction set computer) processor, such as a SUN SPARC processor or the like. In general, Processor 1312 will have a configuration corresponding to one of the extended processor architectures described herein.

A monitor 1314 is included for displaying graphics and text generated by software programs and program modules that are run by computer system 1300. A mouse 1316 (or other pointing device) may be connected to a serial port, USB (Universal Serial Bus) port, or other like bus port communicatively coupled to processor 1312. A keyboard 1318 is communicatively coupled to motherboard 1308 in a similar manner as mouse 1316 for user entry of text and commands. In one embodiment, computer system 1300 also includes a network interface card (NIC) 1320 or built-in NIC interface (not shown) for connecting computer system 1300 to a computer network 1330, such as a local area network (LAN), wide area network (WAN), or the Internet.

Computer system 1300 may also optionally include a compact disk-read only memory ("CD-ROM") drive 1328 into which a CD-ROM disk may be inserted so that executable files, such as an operating system and Java or C# components, and data on the disk can be read or transferred into memory 1310 and/or hard disk 1306. Other mass memory storage devices may be included in computer system 1300.

In another embodiment, computer system 1300 is a handheld or palmtop computer, which are sometimes referred to as Personal Digital Assistants (PDAs). Handheld computers may not include a hard disk or other mass storage, and the executable programs are loaded from a corded or wireless network connection into memory 1310 for execution by processor 1312. A typical computer system 1300 will usually include at least a processor 1312, memory 1310, and a bus (not shown) coupling the memory 1310 to the processor 1312.

It will be appreciated that in one embodiment, computer system 1300 is controlled by operating system software that includes a file management system, such as a disk operating system, which is part of the operating system software. For example, one embodiment of the present invention utilizes a Microsoft Windows® operating system for computer system 1300. In another embodiment, other operating systems such as, but not limited to, an Apple Macintosh® operating system, a Linux-based operating system, the Microsoft Windows CE® operating system, a Unix-based operating system, the 3Com Palm® operating system, or the like may also be use in accordance with the teachings of the present invention.

Thus, embodiments of this invention may be used as or to support a firmware and software code executed upon some form of processing core (such as processor 1312) or otherwise implemented or realized upon or within a machine-readable medium. A machine-readable medium includes any mechanism that provides (i.e., stores and/or transmits) information in a form readable by a machine (e.g., a computer, network device, personal digital assistant, manufacturing tool, any device with a set of one or more processors, etc.). In addition to recordable media, such as disk-based media, a machine-readable medium may include propagated signals such as electrical, optical, acoustical or other form of propagated signals (e.g., carrier waves, infrared signals, digital signals, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
    partitioning a code space allocated to an application into a trusted region and an untrusted region;
    defining operations that are allowed for instructions located in the trusted and untrusted regions;
    determining whether a current instruction is located in the trusted region or the untrusted region; and
    determining whether an operation defined by the current instruction is allowed to be performed based on the region the instruction is located in and the allowed operations defined for instructions in that region, and if not allowed, preventing execution of the operation.

2. The method of claim 1, wherein the operation of determining whether the current instruction is located in the trusted region or the untrusted region comprises operations including:
    storing a trusted region offset defining a location of a boundary partitioning the trusted and untrusted regions of the code space, the trusted region offset comprise an offset from a starting address for the code space;
    obtaining an address for the current instruction specifying an offset from the starting address for the code space at which the current instruction is located; and
    comparing the offset for the address of the current instruction with the trusted region offset to determine the region in which the current instruction is located.

3. The method of claim 2, further comprising:
    storing one of the trusted region offset or a pointer to the trusted region offset in a processor register;
    comparing the offset for the address of the current instruction with the trusted region offset in response to a pointer for the current instruction being loaded into an instruction pointer register of the processor.

4. The method of claim 1, wherein the operation of determining whether the current instruction is located in the trusted region or the untrusted region comprises operations including:
    storing a start address and an end address for the trusted region;
    obtaining an address for the current instruction; and
    determining whether the address falls within the start and end address for the trusted region.

5. The method of claim 1, wherein the operation of determining whether the current instruction is located in the trusted region or the untrusted region comprises operations including:

storing a start address and a size for the trusted region;
obtaining an address for the current instruction; and
determining whether the address falls within the range of addresses specified by the start address and the size of the trusted region.

6. The method of claim 1, further comprising:
throwing a safety trap in response to detection of a disallowed operation; and
applying a security policy to the operation to determine whether or not the operation is allowed to proceed.

7. The method of claim 6, further comprising:
re-vectoring an execution thread to a dynamic verifier in response to a thrown safety trap, the dynamic verifier comprising a software-based component having logic to apply the security policy.

8. The method of claim 7 further comprising performing an exception handling process to recover from an instruction fault corresponding to an operation that is not allowed by the security policy.

9. The method of claim 7, wherein the dynamic verifier a component in a virtual machine framework.

10. The method of claim 9, further comprising performing a virtual machine-based exception handling process to recover from an instruction fault corresponding to an operation that is not allowed by the security policy.

11. The method of claim 6, further comprising:
implementing a hardware-based code sequence truth table for code access sequences, wherein a disallowed code access sequence causes a safety trap to be thrown.

12. The method of claim 11, wherein the code sequence truth table specifies a safety trap is to be thrown in response to a code sequence comprising an unsafe instruction followed by a safe instruction.

13. The method of claim 12, wherein the security policy may allow a return instruction to a calling program located in the trusted region to proceed, but may not allow a call or jump to from an unsafe instruction to access code located in the trusted region to proceed.

14. The method of claim 1, further comprising:
loading type-safe code into the trusted region of the code space; and
loading non-type-safe code into the untrusted region of the code space; and
initializing a mechanism to delineate the trusted region and the untrusted region.

15. The method of claim 14, wherein the type-safe code includes code corresponding to an application written in a type-safe language, and the non-type-safe code includes native code callable by the application written in a type-safe language.

16. The method of claim 14, wherein the non-type-safe code includes a dynamic link library.

17. The method of claim 1, further comprising partitioning the untrusted region into a plurality of sub-regions having different levels of trust.

18. A method, comprising:
partitioning a code space allocated to an application into a trusted region and an untrusted region;
partitioning a data space allocated to the application into a trusted region and an untrusted region;
defining allowable memory access operations based on a location of code in the code space requesting a memory access and a location of data in the data space to which the memory access pertains;
determining a location of code making a memory access request and a location of data requested to be accessed;
determining whether the memory access request is to be allowed, as defined by the allowable memory access operations, based on the location of code requesting the memory access and the location of data requested to be accessed; and
in response to a determination the memory access request is to be allowed, allowing the memory access request to be made.

19. The method of claim 18, wherein the operation of determining the location of code making the memory access request comprises operations including:
storing a trusted region offset for the code space defining an offset location of a boundary partitioning the trusted and untrusted regions of the code space;
obtaining an address for a current instruction corresponding to the memory access request, the address specifying an offset from a start address assigned to the code space at which the current instruction is located; and
comparing the offset for the address of the current instruction with the trusted region offset for the code space to determine the region in the code space in which the current instruction is located.

20. The method of claim 19, further comprising:
storing one of the trusted region offset for the code space or a pointer to the trusted region offset for the code space in a processor register;
comparing the offset for the address of the current instruction with the trusted region offset for the code space in response to a pointer for the current instruction being loaded into an instruction pointer register of the processor.

21. The method of claim 18, wherein the operation of determining the location of code making the memory access request comprises operations including:
storing a start address and an end address for the trusted region;
obtaining an address for the current instruction; and
determining whether the address falls within the start and end address for the trusted region.

22. The method of claim 18, wherein the operation of determining the location of code making the memory access request comprises operations including:
storing a start address and a size for the trusted region;
obtaining an address for the current instruction; and
determining whether the address falls within the range of addresses specified by the start address and the size of the trusted region.

23. The method of claim 18, wherein the operation of determining the location of data requested to be accessed comprises operations including:
storing a trusted region offset for a data space defining an offset location of a boundary partitioning the trusted and untrusted regions of the data space;
obtaining an address at which the data corresponding to the memory request is located, the address specifying an offset from a starting address assigned to the data space at which the data is located; and
comparing the offset for the address at which the data corresponding to the memory request is located with the trusted region offset for the data space to determine the region in the data space in which the data is located.

24. The method of claim 18, further comprising:
throwing a safety trap in response to detection of a disallowed memory access operation; and
applying a security policy to the memory access operation to determine whether or not the memory access operation is allowed to proceed.

25. The method of claim 24, further comprising:
re-vectoring an execution thread to a dynamic verifier in response to a thrown safety trap, the dynamic verifier comprising a software-based component having logic to apply the security policy.

26. The method of claim 24, further comprising performing an exception handling process to recover from an instruction fault corresponding to a memory access operation that is not allowed by the security policy.

27. The method of claim 24, further comprising:
implementing a hardware-based memory access truth table, wherein a disallowed memory access operation causes a safety trap to be thrown.

28. The method of claim 27, wherein the memory access truth table specifies a memory request from code in the untrusted region of the code space is not allowed to access data in the trusted region of the data space.

29. The method of claim 24, further comprising performing a virtual machine exception handling process to recover from an instruction fault corresponding to a memory access operation that is not allowed by the security policy.

30. The method of claim 18, further comprising:
loading type-safe code into the trusted region of the code space;
loading non-type-safe code into the untrusted region of the code space;
allocating data storage corresponding to type-safe code in the trusted region of the data space;
allocating data storage corresponding to the non-type-safe code in the untrusted region of the data space; and
initializing a mechanism to delineate the trusted and untrusted regions.

31. The method of claim 30, wherein the type-safe code includes code corresponding to an application written in a type-safe language, and the non-type-safe code includes native code callable by the application written in a type-safe language.

32. The method of claim 18, further comprising:
partitioning the untrusted region of the code space into a plurality of sub-regions having different levels of trust; and
partitioning the untrusted region of the data space into a plurality of sub-regions having different levels of trust.

33. A processor, comprising:
an instruction pointer;
one of,
a code space SRR register, to store one of a trusted region offset for a code space or a pointer to the trusted region offset for the code space, the trusted region offset to define a boundary between a trusted region and an untrusted region in the code space; or two code space SRR registers, to store data specifying an address range corresponding to the trusted region of the code space;
a mechanism to effectuate a code sequence truth table, wherein the code sequence truth table defines allowable and disallowable instruction sequences corresponding to instructions stored in the trusted region and the untrusted region of the code space; and
a mechanism to throw a safety trap in response to detection of a disallowable instruction sequence.

34. The processor of claim 33, wherein the mechanism to effectuate the code sequence truth table comprises:
programmed logic to determine whether a current instruction is located in the trusted region or the untrusted region of the code space;
a first register bit to store data indicating whether a previous instruction in an execution thread immediately previous to the current instruction is stored in the untrusted region or the untrusted region of the code space;
programmed logic to define a code sequence truth table based specifying whether or not a code sequence is allowable based on the region(s) in which the previous instruction and the current instruction are stored.

35. The processor of claim 34, further comprising a program status register, wherein the first register bit comprises a first bit located at a first location in the program status and control register.

36. The processor of claim 35, further comprising:
programmed logic to store data indicating whether the current instruction is stored in the trusted region or the untrusted region of the code segment by setting or clearing a second bit located at a second location in the program status register.

37. The processor of claim 33, further comprising:
a code segment register to store a segment selector used to locate the code space;
a data segment register to store a segment selector used to locate the data space.

38. A processor, comprising:
a code segment register;
a data segment register;
an instruction pointer;
a code segment Safe Region Register (SRR) register, to store one of a trusted region offset for a code segment or a pointer to the trusted region offset for the code segment, the trusted region offset to define a boundary between a trusted region and an untrusted region in the code segment;
a data segment SRR register, to store one of a trusted region offset for a data segment or a pointer to the trusted region offset for the data segment, the trusted region offset to define a boundary between a trusted region and an untrusted region in the data segment;
a mechanism to effectuate a memory access truth table, wherein the memory access truth table defines allowable and disallowable memory access operations corresponding to a location of code in the code segment requesting the memory access and a location of data in the data segment for which memory access is requested; and
a mechanism to throw a safety trap in response to detection of a disallowable memory access operation.

39. The processor of claim 38, wherein the mechanism to effectuate the memory access truth table comprises:
programmed logic to determine whether a current instruction is located in the trusted region or the untrusted region of the code segment;
a first register bit to store data indicating whether the current instruction is located in the trusted region of the untrusted region of the code segment;
programmed logic to determine whether data corresponding to the memory request is located in the trusted region or the untrusted region of the data segment;
a second register bit to store data indicating whether the data corresponding to the memory request is located in the trusted region or the untrusted region of the data segment;
programmed logic to define a memory access truth table specifying whether or not memory access operations are allowable based on the region in the code segment the code requesting the memory access is located and on the region in the data segment in which the data corresponding to the memory access is located.

40. The processor of claim 39, further comprising a program status and control register, wherein the first register bit comprises a first bit located at a first location in the program status and control register and the second register bit comprises a second bit located at a second location in the program status and control register.

41. A system, comprising:
- a motherboard, including at least one socket in which memory may be installed; and
- a processor, coupled to the motherboard, the processor including:
  - an instruction pointer;
  - one of,
    - a code space SRR register, to store one of a trusted region offset for a code space or a pointer to the trusted region offset for the code space, the trusted region offset to define a boundary between a trusted region and an untrusted region in the code space; or
    - two code space SRR registers, to store data specifying an address range corresponding to the trusted region of the code space;
  - a mechanism to effectuate a code sequence truth table, wherein the code sequence truth table defines allowable and disallowable instruction sequences corresponding to instructions stored in the trusted region and the untrusted region of the code space; and
  - a mechanism to throw a safety trap in response to detection of a disallowable instruction sequence.

42. The system of claim 41, wherein the mechanism to effectuate the code sequence truth table comprises:
- programmed logic to determine whether a current instruction is located in the trusted region or the untrusted region of the code space;
- a first register bit to store data indicating whether a previous instruction in an execution thread immediately previous to the current instruction is stored in the untrusted region or the trusted region of the code space;
- programmed logic to define a code sequence truth table based specifying whether or not a code sequence is allowable based on the region(s) in which the previous instruction and the current instruction are stored.

43. The system of claim 41, wherein the processor further comprises:
- one of,
  - a data space SRR register, to store one of a trusted region offset for a data space or a pointer to the trusted region offset for the data space, the trusted region offset to define a boundary between a trusted region and an untrusted region in the data space; or
  - two data space SRR registers, to store data specifying an address range corresponding to the trusted region of the data space;
- a mechanism to effectuate a memory access truth table, wherein the memory access truth table defines allowable and disallowable memory access operations corresponding to a location of code in the code space requesting the memory access and a location of data in the data space for which memory access is requested; and
- a mechanism to throw a safety trap in response to detection of a disallowable memory access operation.

44. The system of claim 43, wherein the mechanism to effectuate the memory access truth table comprises:
- programmed logic to determine whether a current instruction is located in the trusted region or the untrusted region of the code space;
- a first register bit to store data indicating whether the current instruction is located in the trusted region or the untrusted region of the code space;
- programmed logic to determine whether data corresponding to the memory request is located in the trusted region or the untrusted region of the data space;
- a second register bit to store data indicating whether the data corresponding to the memory request is located in the trusted region or the untrusted region of the data space; and
- programmed logic to define a memory access truth table specifying whether or not memory access operations are allowable based on the region in the code space the code requesting the memory access is located and on the region in the data space in which the data corresponding to the memory access is located.

45. An instruction prefetch unit, comprising:
- a program counter for specifying a memory location from which to fetch an instruction;
- a code space SRR register, to store one of a trusted region offset for a code space or a pointer to the trusted region offset for the code space, the trusted region offset to define a boundary between a trusted region and an untrusted region in the code space;
- programmed logic for determining a disallowed code access sequence by determining whether the program counter references an code access sequence in the trusted region or the untrusted region of the code space; and
- a hardware-based code sequence truth table for code access sequences, wherein a disallowed code access sequence causes a safety trap to be thrown.

* * * * *

UNITED STATES PATENT AND TRADEMARK OFFICE
CERTIFICATE OF CORRECTION

| | | |
|---|---|---|
| PATENT NO. | : 7,380,276 B2 | |
| APPLICATION NO. | : 10/851860 | |
| DATED | : May 27, 2008 | |
| INVENTOR(S) | : Saha et al. | |

It is certified that error appears in the above-identified patent and that said Letters Patent is hereby corrected as shown below:

In column 10, at line 3, delete "4b." and insert --6b.--.

Signed and Sealed this

Ninth Day of December, 2008

JON W. DUDAS
*Director of the United States Patent and Trademark Office*